US012764788B2

(12) United States Patent
Lu et al.

(10) Patent No.: US 12,764,788 B2
(45) Date of Patent: Oct. 13, 2026

(54) METHOD AND DEVICE FOR WIRELESS COMMUNICATION

(71) Applicant: GUANGDONG OPPO MOBILE TELECOMMUNICATIONS CORP., LTD., Dongguan (CN)

(72) Inventors: Liuming Lu, Dongguan (CN); Lei Huang, Singapore (SG); Chaoming Luo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 352 days.

(21) Appl. No.: 18/430,626

(22) Filed: Feb. 1, 2024

(65) Prior Publication Data

US 2024/0179739 A1 May 30, 2024

Related U.S. Application Data

(63) Continuation of application No. PCT/CN2021/111619, filed on Aug. 9, 2021.

(51) Int. Cl.
*H04W 74/0816* (2024.01)

(52) U.S. Cl.
CPC ................................ *H04W 74/0816* (2013.01)

(58) Field of Classification Search
CPC . H04W 74/0816; H04W 84/12; H04W 88/08; H04L 5/0044; H04L 2001/0096
See application file for complete search history.

(56) References Cited

U.S. PATENT DOCUMENTS

2016/0255656 A1* 9/2016 Lou ............................ H04L 1/16 370/335
2021/0127420 A1* 4/2021 Lu ..................... H04W 74/0808
2021/0160347 A1 5/2021 Chu
2021/0211375 A1 7/2021 Kwon
2021/0212118 A1 7/2021 Lu
2022/0338253 A1* 10/2022 Lu ........................ H04W 74/085
2023/0262768 A1* 8/2023 Ko ..................... H04W 52/0216
2023/0300903 A1* 9/2023 Kim ....................... H04L 69/321 370/329
2024/0064837 A1* 2/2024 Kim ....................... H04L 5/0053

FOREIGN PATENT DOCUMENTS

CN 112218336 A 1/2021
CN 112752335 A 5/2021
CN 113068214 A 7/2021

OTHER PUBLICATIONS

First Office Action of the European application No. 21953057.3, issued on Feb. 18, 2025.

(Continued)

*Primary Examiner* — Yemane Mesfin
*Assistant Examiner* — Salma Ayad
(74) *Attorney, Agent, or Firm* — Ladas & Parry, LLP

(57) ABSTRACT

A method and device for wireless communication are provided. According to channel access features of an NSTR AP MLD in a primary link and a secondary link, a channel access method based on a specific rule and a channel access scheme based on a synchronous medium access latency are designed.

20 Claims, 35 Drawing Sheets

(56) References Cited

OTHER PUBLICATIONS

Supplementary European Search Report issued on Aug. 26, 2024 for the European Patent Application No. 21953057.3.
International Search Report in the international application No. PCT/CN2021/111619, mailed on May 9, 2022, 5 pages with English translation.
Written Opinion of the International Search Authority in the international application No. PCT/CN2021/111619, mailed on May 9, 2022, 6 pages with English translation.
IEEE P802.11be™/D1.01, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT), Prepared by the 802.11 Working Group of the LAN/MAN Standards Committee of the IEEE Computer Society, Jun. 2021.
Jinjing Jiang, Apple Inc., "Operation with Non-STR AP", Date: May 15, 2020, doc.: IEEE 802.11-20/755r1.

* cited by examiner

200

METHOD AND DEVICE FOR WIRELESS COMMUNICATION

CROSS-REFERENCE TO RELATED APPLICATION

The present disclosure is a US continuation application of International Application No. PCT/CN2021/111619, filed on Aug. 9, 2021. The disclosure of the above application is hereby incorporated by reference in its entirety.

BACKGROUND

Soft access point multi-link device (soft AP MLD) may be used in Wireless Fidelity (WiFi) hotspot or network sharing. Since the soft AP MLD has Nonsimultaneous Transmit and Receive (NSTR) characteristics, NSTR-based interference or collision easily occurs on primary and non-primary links in a scenario of the soft AP MLD.

SUMMARY

Embodiments of the disclosure relate to the field of communications, and more particularly to a method and device for wireless communication. Embodiments of the disclosure provide a method and device for wireless communication.

According to a first aspect, there is provided a method for wireless communication, the method for wireless communication is applied to a non-access point multi-link device (Non-AP MLD), the Non-AP MLD at least includes a first non-access point station (Non-AP STA) affiliated to the Non-AP MLD and a second Non-AP STA affiliated to the Non-AP MLD, the first Non-AP STA operates on a primary link and obtains a first transmission opportunity (TXOP) on the primary link, the second Non-AP STA operates on a non-primary link and obtains a second TXOP on the non-primary link, and the method includes the following operations.

The first Non-AP STA affiliated to the Non-AP MLD and the second Non-AP STA affiliated to the Non-AP MLD simultaneously transmit at least one physical layer protocol data unit (PPDU) in the first TXOP and the second TXOP respectively.

The first TXOP and the second TXOP meet at least one of following:

- an end time of the second TXOP is no later than an end time of the first TXOP;
- an end time of a transmission sequence in the second TXOP is no later than an end time of a transmission sequence in the first TXOP;
- the end time of the second TXOP is no later than a first time, wherein the first time is a time obtained by adding the end time of the first TXOP to a maximum allowable time deviation; or
- the end time of the transmission sequence in the second TXOP is no later than a second time, wherein the second time is a time obtained by adding the end time of the transmission sequence in the first TXOP to the maximum allowable time deviation.

According to a second aspect, there is provided a method for wireless communication, the method for wireless communication is applied to an access point multi-link device (AP MLD), the AP MLD at least includes a first access point (AP) affiliated to the AP MLD and a second AP affiliated to the AP MLD, the first AP operates on a primary link and obtains a third TXOP on the primary link, the second AP operates on a non-primary link and obtains a fourth TXOP on the non-primary link, and the method includes the following operations.

The first AP affiliated to the AP MLD and the second AP affiliated to the AP MLD simultaneously transmit at least one PPDU in the third TXOP and the fourth TXOP respectively.

The third TXOP and the fourth TXOP meet at least one of following:

- an end time of the fourth TXOP is no later than an end time of the third TXOP;
- an end time of a transmission sequence in the fourth TXOP is no later than an end time of a transmission sequence in the third TXOP;
- the end time of the fourth TXOP is no later than a third time, wherein the third time is a time obtained adding the end time of the third TXOP to a maximum allowable time deviation; or
- the end time of the transmission sequence in the fourth TXOP is no later than a fourth time, wherein the fourth time is a time obtained by adding the end time of the transmission sequence in the third TXOP to the maximum allowable time deviation.

According to a third aspect, there is provided a method for wireless communication, the method for wireless communication is applied to a Non-AP MLD, the Non-AP MLD at least includes a first Non-AP STA affiliated to the Non-AP MLD and a second Non-AP STA affiliated to the Non-AP MLD, the first Non-AP STA operates on a primary link, the second Non-AP STA operates on a non-primary link, and the method includes the following operations.

The first Non-AP STA affiliated to the Non-AP MLD performs channel access on the primary link according to a first duration.

According to a fourth aspect, there is provided a method for wireless communication, the method for wireless communication is applied to a third Non-AP STA, the third Non-AP STA is associated with a first AP affiliated to an AP MLD, the AP MLD at least includes the first AP affiliated to the AP MLD and a second AP affiliated to the AP MLD, the third Non-AP STA and the first AP operate on a primary link, the second AP operates on a non-primary link, and the method includes the following operations.

The third Non-AP STA performs channel access on the primary link according to a second duration.

According to a fifth aspect, there is provided a device for wireless communication, the device for wireless communication is configured to execute the method in any one of the above first to fourth aspects.

Specifically, the device for wireless communication includes functional modules configured to execute the method in any one of the above first to fourth aspects.

According to a sixth aspect, there is provided a device for wireless communication, the device for wireless communication includes a processor and a memory. The memory is configured to store a computer program, and the processor is configured to call and run the computer program stored in the memory, to execute the method in any one of the above first to fourth aspects.

According to a seventh aspect, there is provided an apparatus, the apparatus is configured to implement the method in any one of the above first to fourth aspects.

Specifically, the apparatus includes a processor configured to call and run a computer program from a memory, so that a device installed with the apparatus executes the method in any one of the above first to fourth aspects.

According to an eighth aspect, there is provided a computer-readable storage medium, the computer-readable storage medium is configured to store a computer program, the computer program allows a computer to execute the method in any one of the above first to fourth aspects.

According to a ninth aspect, there is provided a computer program product, the computer program product includes computer program instructions, the computer program instructions allow a computer to execute the method in any one of the above first to fourth aspects.

According to a tenth aspect, there is provided a computer program, the computer program allows a computer to execute the method in any one of the above first to fourth aspects when the computer program is run on the computer.

According to the technical solution of the above first aspect, the first TXOP obtained by the first Non-AP STA on the primary link and the second TXOP obtained by the second Non-AP STA on the non-primary link are limited and constrained, so that the NSTR-based interference or collision is prevented from occurring on transmission of primary and secondary links when the first Non-AP STA affiliated to the Non-AP MLD and the second Non-AP STA affiliated to the Non-AP MLD simultaneously transmit at least one PPDU in the first TXOP and the second TXOP respectively.

According to the technical solution of the above second aspect, the third TXOP obtained by the first AP on the primary link and the fourth TXOP obtained by the second AP on the non-primary link are limited and constrained, so that the NSTR-based interference or collision is prevented from occurring on transmission of primary and secondary links when the first AP affiliated to the AP MLD and the second AP affiliated to the AP MLD simultaneously transmit at least one PPDU in the third TXOP and the fourth TXOP respectively.

According to the technical solution of the above third aspect, the first Non-AP STA performs channel access on the primary link according to the first duration, so that the NSTR-based interference or collision may be prevented from occurring on transmission of primary and secondary links.

According to the technical solution of the above fourth aspect, the third Non-AP STA performs channel access on the primary link according to the second duration, so that the NSTR-based interference or collision may be prevented from occurring on transmission of primary and secondary links.

DETAILED DESCRIPTION

How to prevent the NSTR-based interference or collision from occurring on primary and non-primary links of the soft AP MLD, is a problem urgently to be solved. Embodiments of the disclosure provide a method and device for wireless communication, which may prevent the NSTR-based interference or collision from occurring on primary and non-primary links of an NSTR AP MLD (such as a soft AP MLD).

The technical solutions in the embodiments of the disclosure will be described below with reference to the drawings in the embodiments of the disclosure. It is apparent that the described embodiments are part of the embodiments of the disclosure, rather than all of the embodiments. With respect to the embodiments of the disclosure, all other embodiments obtained by those of ordinary skill in the art without paying any creative work belong to the scope of protection of the disclosure.

The technical solutions of the embodiments of the disclosure may be applied to various communication systems, such as a Wireless Local Area Network (WLAN), Wireless Fidelity (WiFi), or other communication systems, etc.

Figure 1:
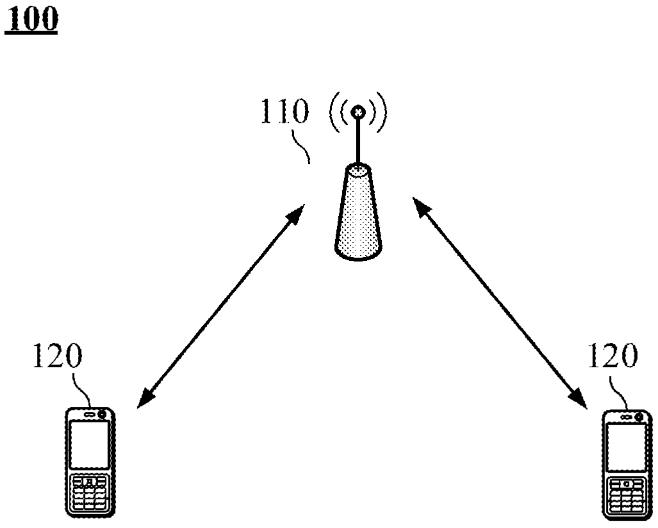
FIG. 1 is a schematic diagram of a communication system architecture applied to an embodiment of the disclosure.

Exemplarily, a communication system 100 to which the embodiments of the disclosure are applied is shown in FIG. 1. The communication system 100 may include an Access Point Station (AP STA) 110 and a Non-Access Point Station (Non-AP STA) 120 accessing a network through the AP STA 110.

In some embodiments, the AP STA 110 and/or the Non-AP STA 120 may be deployed on the land, including indoor or outdoor, handheld, worn or vehicle-mounted deployment; or, may be deployed in the water (such as a ship); or, may be deployed in the air (such as an aircraft, a balloon, a satellite, etc.).

In the embodiments of the disclosure, the Non-AP STA 120 may be a mobile phone, a pad, a computer with a wireless transceiver function, a Virtual Reality (VR) device, an Augmented Reality (AR) device, a wireless device in industrial control, a wireless device in self driving, a wireless device in remote medical, a wireless device in a smart grid, a wireless device in transportation safety, a wireless device in a smart city, or a wireless device in a smart home, etc.

As an example rather than limitation, in the embodiments of the disclosure, the Non-AP STA 120 may also be a wearable device. The wearable device may also be referred to as a wearable smart device, which is a general term for wearable devices developed by applying wearable technologies to intelligently design daily wears, such as glasses, gloves, watches, clothing, shoes, etc. The wearable device is a portable device which is directly worn on the body or integrated into a user's clothing or accessory. The wearable device is not only a hardware device, but also achieves powerful functions through supporting of software, data interaction and cloud-based interaction. Generalized wearable smart devices include devices with full functions, large sizes, implementing complete or partial functions without relying on smart phones, such as smart watches or smart glasses, etc., and devices focusing on only a certain type of application functions and requiring cooperation with other devices such as smart phones in use, such as various smart bracelets for monitoring physical signs, smart jewelry, etc.

FIG. 1 exemplarily shows one AP STA and two Non-AP STAs. In some embodiments, the communication system 100 may include multiple AP STAs and other numbers of Non-AP STAs, which are not limited in the embodiments of the disclosure.

It should be understood that in the embodiments of the disclosure, a device with a communication function in a network/system may be referred to as a communication device. The communication system 100 shown in FIG. 1 is taken as an example, the communication device may include an AP STA 110 and a Non-AP STA 120 with communication functions, and the AP STA 110 and the Non-AP STA 120 may be the above specific devices respectively, which are not elaborated here. The communication device may also include other devices in the communication system 100, such as a network controller, gateway and other network entities, which are not limited in the embodiments of the disclosure.

It should be understood that in the disclosure, terms "system" and "network" are often interchangeably used here. In the disclosure, a term "and/or" is only an association relationship describing associated objects, and indicates that there may be three relationships. For example, A and/or B may indicate three situations, i.e., A exists alone, A and B exist simultaneously, and B exists alone. Furthermore, in the disclosure, a character "/" generally indicates that anterior and posterior associated objects are in a "or" relationship.

It should be understood that "indication" mentioned in the embodiments of the disclosure may be a direct indication, or may be an indirect indication, or may indicate that there is an association relationship. For example, A indicates B, which may mean that A directly indicates B, for example, B may be obtained through A; or, may mean that A indirectly indicates B, for example, A indicates C, and B may be obtained through C; or, may mean that there is an association relationship between A and B.

Terms used in sections of the embodiments of the disclosure are only intended to explain specific embodiments of the disclosure, and are not intended to limit the disclosure. Terms "first", "second", "third", "fourth" or the like in the description, claims and the drawings of the disclosure are intended to distinguish different objects, and are not intended to describe a specific order. Furthermore, terms "include", "have" as well as any variants thereof, are intended to cover a non-exclusive inclusion.

In descriptions of the embodiments of the disclosure, a term "corresponding" may indicate that there are direct or indirect correspondences between two items; or, may indicate that there is an association relationship between two items; or, may be a relationship such as indicating and indicated, configuring and configured, etc.

In the embodiments of the disclosure, "predefined" or "preconfigured" may be implemented by pre-saving corresponding codes, tables or other manners which may be used to indicate related information in a device (for example, including a STA and a network), specific implementations thereof are not limited in the disclosure. For example, "predefined" may refer to "defined in a protocol".

In the embodiments of the disclosure, "protocol" may refer to a standard protocol in the communication field, for example, it may include a WiFi protocol and related protocols applied to future WiFi communication systems, which are not limited in the disclosure.

In order to facilitate understanding the embodiments of the disclosure better, technologies related to the disclosure will be described.

WLAN is widely used in enterprises, homes and other scenarios, due to low cost, flexibility, easy expansion and other characteristics thereof. Nowadays, a wireless product called "soft AP" is very common on the market. Since it is unnecessary to deploy a dedicated AP, the soft AP may build a wireless network almost at any desired place and have low cost. The soft AP is especially suitable to provides an economical and fast networking manner for a small number of users in small offices and home environments. The soft AP is also suitable for construction sites, exhibitions, sports meets, and other places requiring temporary networking. In a multi-link section of the 802.11be draft standard, an operation mechanism of a Non Simultaneous Transmit and Receive (NSTR) Access Point multi-link device (AP MLD) is proposed and instantiated into a soft AP MLD. Such soft AP MLD is usually located in a mobile device powered by a battery. The most common usage examples for this type of soft AP MLD is WiFi hotspot or network sharing.

Links provided by NSTR soft AP MLD are divided into primary link and non-primary link (secondary link). The soft AP MLD communicates with traditional devices and single-link devices only on the primary link. Multi-link devices (MLDs) may communicate with the soft AP MLD on the primary link and the non-primary link. In order to ensure transmission quality of traditional devices and single-link devices, when the soft AP MLD needs to transmit on the non-primary link, the soft AP MLD must be a transmission opportunity (TXOP) holder on the primary link. Further, in case of a non-access point multi-link device (Non-AP MLD) associated with the soft AP MLD, only when a STA affiliated to the non-AP MLD initiates transmission of physical layer protocol data units (PPDUs) as a TXOP holder on the primary link, another STA affiliated to the non-AP MLD may initiate transmission of PPDUs on the non-primary link.

A Non-AP MLD is associated with an NSTR AP MLD (including the NSTR soft AP MLD), two APs (AP1 on the primary link and AP2 on the secondary link) affiliated to the NSTR soft AP MLD or two STAs (STA1 on the primary link or STA2 on the secondary link) affiliated to the non-AP MLD obtain TXOPs and start simultaneous transmission. When an end time of TXOP on the secondary link is later than an end time of TXOP on the primary link, in a case that a third STA associated with the NSTR soft AP MLD or AP1 and located on the primary link directly sends PPDUs after obtaining a TXOP and the transmission on the secondary link is still ongoing, it may cause a simultaneous transmission and reception phenomenon on the NSTR soft AP MLD side, thereby resulting in NSTR-based interference or collision.

Figure 2:
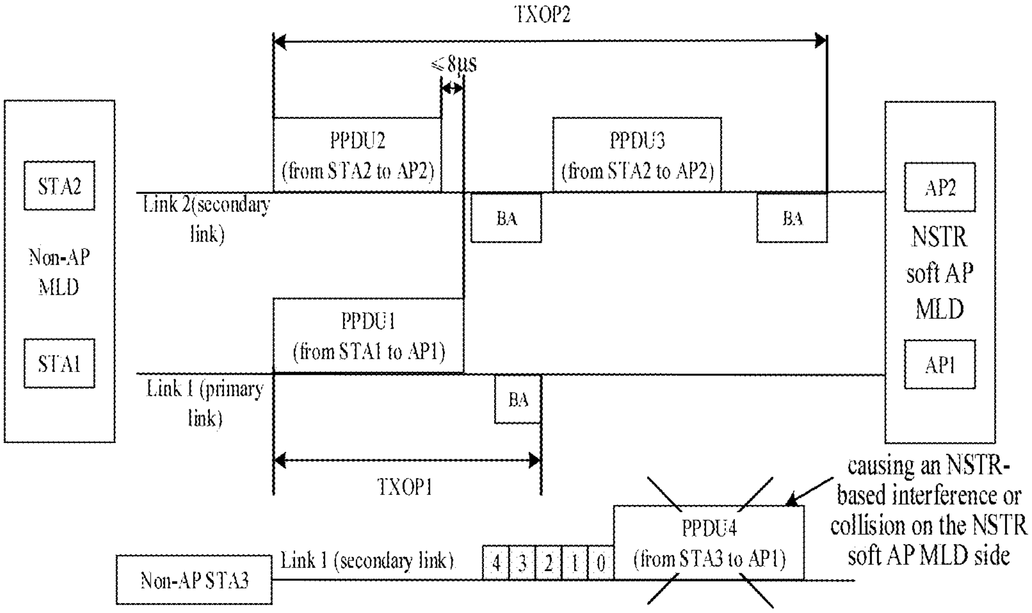
FIG. 2 is a schematic diagram of collision caused by a too long transmission sequence of a secondary link according to the disclosure.

As shown in FIG. 2, both Non-AP MLD and Non-AP STA3 are associated with the NSTR soft AP MLD. In case of the Non-AP MLD, a duration of TXOP1 obtained by STA1 on the primary link is less than that of TXOP2 obtained by STA2 on the secondary link. Since TXOP1 ends earlier than TXOP2, the Non-AP STA3 on the primary link obtains a channel access opportunity to send PPDU4 after TXOP1 ends, however, transmission is still made between STA2 and AP2 in TXOP2, which causes a simultaneous transmission and reception phenomenon on the NSTR soft AP MLD side, resulting in collision.

Figure 3:
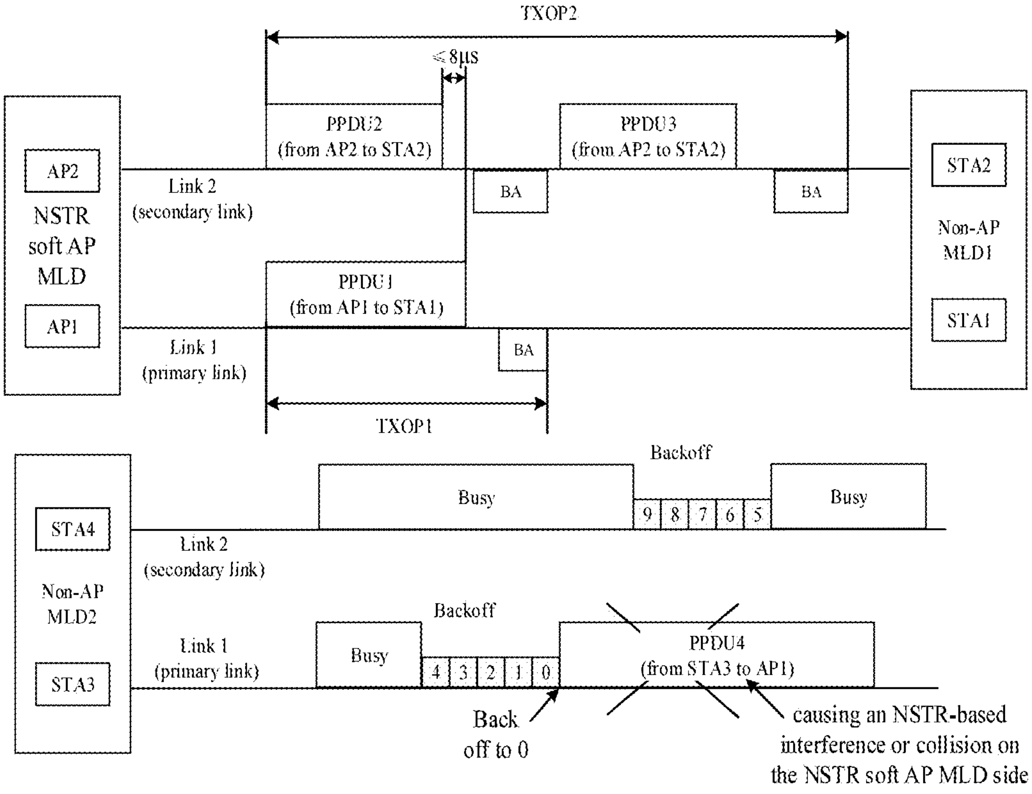
FIG. 3 is a schematic diagram of another collision caused by a too long transmission sequence of a secondary link according to the disclosure.

As shown in FIG. 3, both Non-AP MLD1 and Non-AP MLD2 are associated with the NSTR soft AP MLD. In case of the NSTR soft AP MLD, a duration of TXOP1 obtained by AP1 on the primary link is less than that of TXOP2 obtained by AP2 on the secondary link. Since TXOP1 ends earlier than TXOP2, the Non-AP STA3 with the Non-AP MLD2 on the primary link obtains a channel access opportunity to send PPDUs after TXOP1 ends, however, transmission is still made between STA2 and AP2 in TXOP2, which causes a simultaneous transmission and reception phenomenon on the NSTR soft AP MLD side, resulting in collision.

Based on the above problems, the disclosure proposes a channel access solution with respect to channel access characteristics of the NSTR AP MLD (such as the soft AP MLD) on the primary link and the non-primary link (the secondary link), to prevent the NSTR-based interference or collision from occurring on transmission of the NSTR AP MLD (such as the soft AP MLD) on the primary link and the secondary link.

The technical solutions of the disclosure are described in detail below through specific embodiments.

Figure 4:
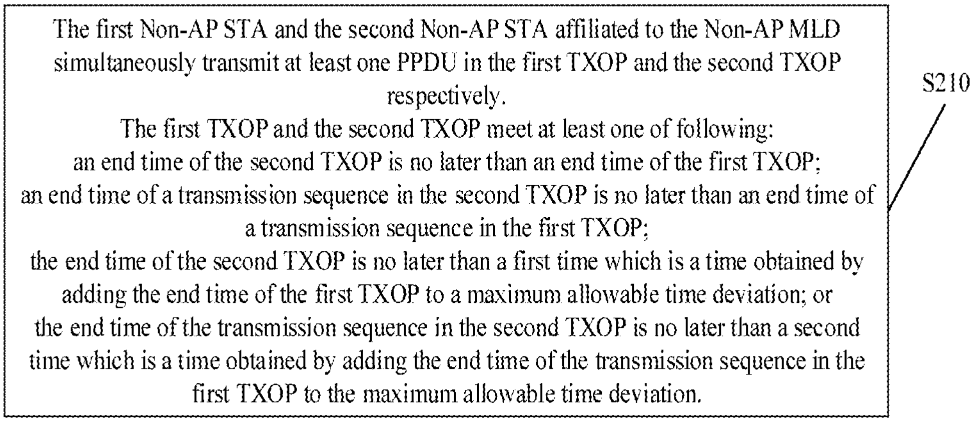
FIG. 4 is a schematic flowchart of a method for wireless communication according to an embodiment of the disclosure.

FIG. 4 is a schematic flowchart of a method for wireless communication 200 according to an embodiment of the disclosure. The method for wireless communication 200 is applied to a Non-AP MLD, the Non-AP MLD includes at least a first Non-AP STA and a second Non-AP STA affiliated to the Non-AP MLD, the first Non-AP STA operates on a primary link and obtains a first TXOP on the primary link, the second Non-AP STA operates on a non-primary link and obtains a second TXOP on the non-primary link.

As shown in FIG. 4, the method for wireless communication 200 may include at least a part of the following contents.

At S210, the first Non-AP STA and the second Non-AP STA affiliated to the Non-AP MLD simultaneously transmit at least one PPDU in the first TXOP and the second TXOP respectively.

The first TXOP and the second TXOP meet at least one of following:

an end time of the second TXOP is no later than an end time of the first TXOP;

an end time of a transmission sequence in the second TXOP is no later than an end time of a transmission sequence in the first TXOP;

the end time of the second TXOP is no later than a first time which is a time obtained by adding the end time of the first TXOP to a maximum allowable time deviation; or the end time of the transmission sequence in the second TXOP is no later than a second time which is a time obtained by adding the end time of the transmission sequence in the first TXOP to the maximum allowable time deviation.

In some embodiments, the maximum allowable time deviation is pre-configured or agreed on by a protocol.

In some embodiments, the maximum allowable time deviation is configured by an AP MLD. For example, the AP MLD associated with the Non-AP MLD configures the maximum allowable time deviation for the Non-AP MLD.

In the embodiment of the disclosure, the non-primary link may also be referred to as a secondary link. In the embodiment of the disclosure, the two terms may be replaced with each other.

In the embodiment of the disclosure, the first Non-AP STA and the second Non-AP STA may be STAs affiliated to the Non-AP MLD.

In some embodiments, "simultaneous transmission" may also be referred to as "synchronous transmission", that is, the above S210 may also be expressed as: the first Non-AP STA and the second Non-AP STA affiliated to the Non-AP MLD synchronously transmit at least one PPDU in the first TXOP and the second TXOP respectively.

In some embodiments, the Non-AP MLD is associated with an NSTR AP MLD, the NSTR AP MLD includes at least a first AP operating on the primary link and a second AP operating on the non-primary link, and a link where the first AP is located and a link where the second AP is located belong to an NSTR link pair of the NSTR AP MLD.

The first AP and the second AP may be APs affiliated to the NSTR AP MLD.

In some embodiments, the NSTR AP MLD is an NSTR soft AP MLD or an NSTR mobile AP MLD.

In some embodiments, the NSTR AP MLD includes at least one NSTR link pair, one of the at least one NSTR link pair includes the primary link and the non-primary link.

In some embodiments, a duration of the first TXOP completely overlaps with a duration of the second TXOP in a time domain; or, the duration of the first TXOP partially overlaps with the duration of the second TXOP in the time domain. Therefore, the first Non-AP STA and the second Non-AP STA affiliated to the Non-AP MLD simultaneously transmit at least one PPDU in the first TXOP and the second TXOP respectively.

In some embodiments, a time when the second Non-AP STA starts transmitting the PPDU in the second TXOP is not earlier than a time when the first Non-AP STA starts transmitting the PPDU in the first TXOP.

In some embodiments, end times of PPDUs transmitted simultaneously on the primary link and the non-primary link meet an alignment requirement.

In some embodiments, the end times of the PPDUs transmitted simultaneously on the primary link and the non-primary link meeting the alignment requirement includes that: the end times of the PPDUs transmitted simultaneously on the primary link and the non-primary link are the same; or, a difference between the end times of the PPDUs transmitted simultaneously on the primary link and the non-primary link is less than or equal to a preset value. Therefore, it may be ensured that the NSTR-based interference or collision does not occur on the NSTR AP MLD or the Non-AP MLD.

For example, the preset value is 8 μs.

In some embodiments, the preset value is pre-configured or agreed on by a protocol.

In some embodiments, the preset value is configured by an AP MLD. For example, the AP MLD associated with the Non-AP MLD configures the preset value for the Non-AP MLD.

In some embodiments, for the PPDUs transmitted simultaneously on the primary link and the non-primary link, an end time of a PPDU transmitted on the primary link and carrying a reply acknowledgment (ACK) frame is not later than an end time of a PPDU transmitted on the non-primary link and carrying a reply ACK frame. Therefore, it may be ensured that transmission of a next PPDU may be started first on the primary link, compared to the non-primary link.

In some embodiments, in a case that the first Non-AP STA fails to send PPDUs on the primary link, the first Non-AP STA affiliated to the Non-AP MLD restart a backoff process on the primary link.

In some embodiments, in a case that the second Non-AP STA detects that the first Non-AP STA restarts a backoff process on the primary link, the second Non-AP STA affiliated to the Non-AP MLD stops transmitting to-be-transmitted PPDUs on the non-primary link, and the second Non-AP STA affiliated to the Non-AP MLD restarts the backoff process on the non-primary link.

In some embodiments, in a case that the second Non-AP STA detects that the first Non-AP STA restarts a backoff process on the primary link, the second Non-AP STA affiliated to the Non-AP MLD transmits a Contention Free End (CF-End) frame on the non-primary link. The CF-End frame is configured to indicate early termination of the second TXOP.

In some embodiments, in a case that the first Non-AP STA fails to send PPDUs on the primary link, the first Non-AP STA affiliated to the Non-AP MLD executes a priority interframe space (PIFS) recovery mechanism.

In some embodiments, in a case that the second Non-AP STA detects that the first Non-AP STA fails to send PPDUs on the primary link, the first Non-AP STA does not restart a backoff process on the primary link, and the first Non-AP STA executes a PIFS recovery mechanism, the second Non-AP STA affiliated to the Non-AP MLD stops transmitting to-be-transmitted PPDUs on the non-primary link and the second Non-AP STA affiliated to the Non-AP MLD maintains a backoff counter thereof to be zero until the first Non-AP STA starts transmitting PPDUs after executing the PIFS recovery mechanism.

In some embodiments, in a case that a condition for triggering the backoff process does not occur and the channel on the non-primary link is detected to be idle during a period when the second Non-AP STA maintains the backoff counter thereof to be zero, the second Non-AP STA affiliated to the Non-AP MLD transmits PPDUs in the second TXOP, while the first Non-AP STA transmits PPDUs on the primary link after executing the PIFS recovery mechanism.

After the first Non-AP STA executes the PIFS recovery mechanism, end times of PPDUs transmitted simultaneously on the primary link and the non-primary link are the same; or, a difference between the end times of the PPDUs transmitted simultaneously on the primary link and the non-primary link is less than or equal to a preset value.

In some embodiments, in a case that a condition for triggering the backoff process occurs during a period when the second Non-AP STA maintains the backoff counter thereof to be zero, the second Non-AP STA affiliated to the Non-AP MLD restarts the backoff process.

In some embodiments, in a case that a duration setting type used by the first Non-AP STA in the first TXOP is single protection, a duration setting type used by the second Non-AP STA in the second TXOP is also single protection.

In some embodiments, in a case that a duration setting type used by the first Non-AP STA in the first TXOP is single protection, a duration setting type used by the second Non-AP STA in the second TXOP is not allowed to be multiple-protection.

In some embodiments, in a case that a duration setting type used by the first Non-AP STA in the first TXOP is multiple-protection, a duration setting type used by the second Non-AP STA in the second TXOP is single protection or multiple-protection.

Therefore, in the embodiment of the disclosure, the first TXOP obtained by the first Non-AP STA on the primary link and the second TXOP obtained by the second Non-AP STA on the non-primary link are limited and constrained, so that the NSTR-based interference or collision is prevented from occurring on transmission of primary and secondary links when the first Non-AP STA and the second Non-AP STA affiliated to the Non-AP MLD simultaneously transmit at least one PPDU in the first TXOP and the second TXOP respectively.

The technical solutions in the method for wireless communication 200 of the disclosure are described in detail below through first to fourth embodiments. Specifically, STA1 corresponds to the above first Non-AP STA, STA2 corresponds to the above second Non-AP STA, AP1 corresponds to the above first AP, AP2 correspond to the above second AP, TXOP1 corresponds to the above first TXOP, and TXOP2 corresponds to the above second TXOP.

The first embodiment corresponds to below solutions shown in FIG. 5 to FIG. 7.

Figure 5:
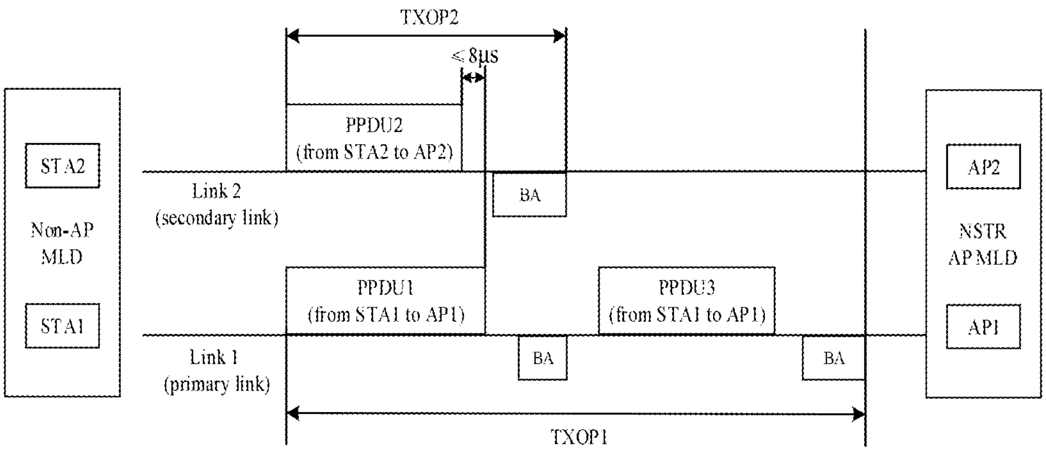
FIG. 5 to FIG. 11 are schematic diagrams of a Non-AP MLD transmitting PPDUs on primary and secondary links according to an embodiment of the disclosure respectively.

As shown in FIG. 5, in the Non-AP MLD associated with the NSTR AP MLD (such as the NSTR soft AP MLD or the NSTR mobile AP MLD), when STA1 obtains TXOP (set to be TXOP1) on the primary link, STA2 also obtains TXOP (set to be TXOP2) on the secondary link, STA1 and STA2 start transmitting PPDUs simultaneously within TXOPs obtained respectively; PPDU1 and PPDU2 transmitted simultaneously meet an alignment requirement of end times of transmitting the PPDUs (a difference between an end time of PPDU1 and an end time of PPDU2≤8 μs, which may be considered as meeting the alignment requirement). Furthermore, an end point time of TXOP1 obtained by STA1 is later than an end point time of TXOP2, the NSTR-based interference or collision thus may be prevented from occurring on transmission of the NSTR AP MLD on the primary link and the secondary link.

Figure 6:
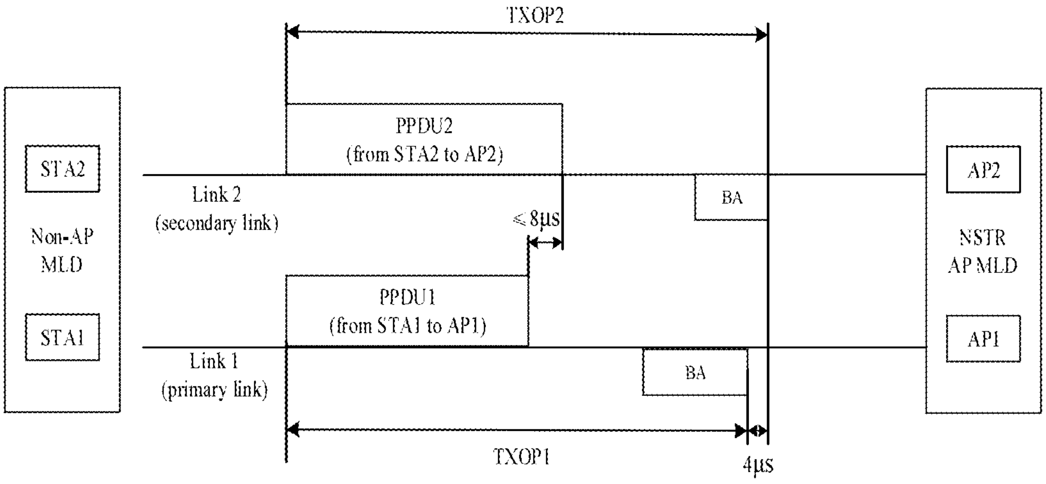

As shown in FIG. 6, in the Non-AP MLD associated with the NSTR AP MLD (such as the NSTR soft AP MLD or the NSTR mobile AP MLD), when STA1 obtains TXOP (set to be TXOP1) on the primary link, STA2 also obtains TXOP (set to be TXOP2) on the secondary link, STA1 and STA2 start transmitting PPDUs simultaneously within TXOPs obtained respectively; PPDU1 and PPDU2 transmitted simultaneously meet an alignment requirement of end times of transmitting the PPDUs (a difference between an end time of PPDU1 and an end time of PPDU2≤8 μs, which may be considered as meeting the alignment requirement). Furthermore, an end point time of TXOP2 obtained by STA2 is earlier than an end point time of TXOP1 obtained by STA1 plus a deviation threshold (set to be 8 μs), the NSTR-based interference or collision thus may be prevented from occurring on transmission of the NSTR AP MLD on the primary link and the secondary link.

Figure 7:
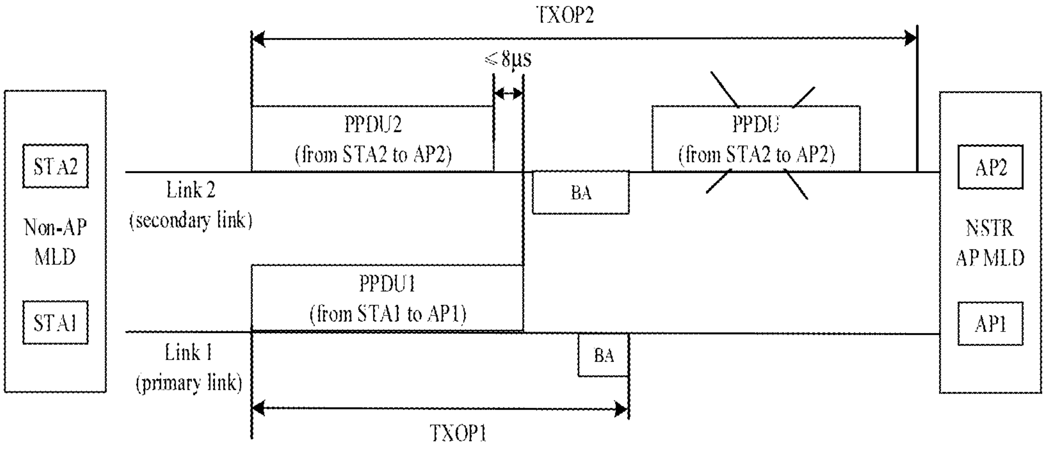

As shown in FIG. 7, in the Non-AP MLD associated with the NSTR AP MLD (such as the NSTR soft AP MLD or the NSTR mobile AP MLD), STA1 obtains TXOP (set to be TXOP1) on the primary link, STA2 obtains TXOP (set to be TXOP2) on the secondary link, an end point time of TXOP1 is earlier than an end point time of TXOP2, and a deviation between end point times of the two TXOPs is greater than a deviation threshold (set to be 8 μs). Therefore, the NSTR-based interference or collision may occur on transmission of the NSTR AP MLD on the primary link and the secondary link.

The second embodiment corresponds to below solutions shown in FIG. 8 to FIG. 9. Specifically, STA1 corresponds to the above first Non-AP STA, STA2 corresponds to the above second Non-AP STA, TXOP1 corresponds to the above first TXOP, and TXOP2 corresponds to the above second TXOP.

Figure 8:
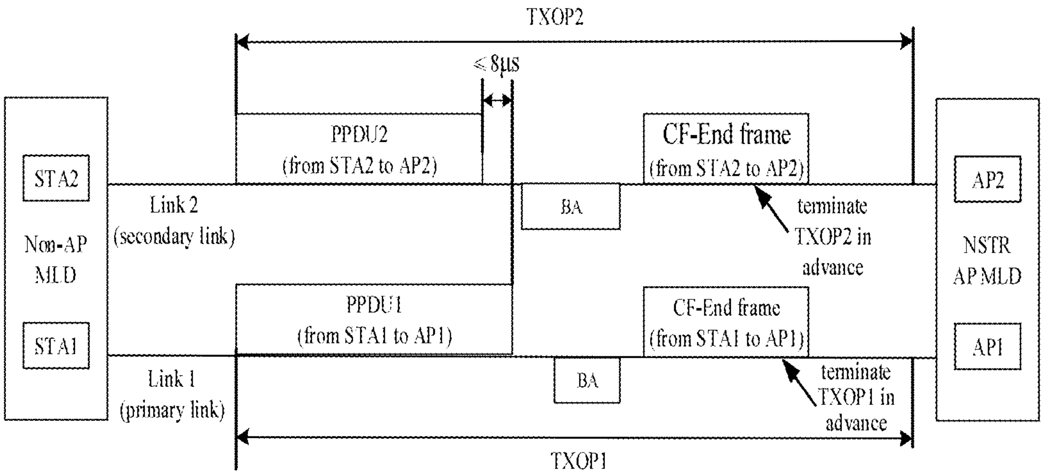

As shown in FIG. 8, in the Non-AP MLD associated with the NSTR AP MLD (such as the NSTR soft AP MLD or the NSTR mobile AP MLD), when STA1 obtains TXOP (set to be TXOP1) on the primary link, STA2 also obtains TXOP (set to be TXOP2) on the secondary link, STA1 and STA2 start transmitting PPDUs simultaneously within TXOPs obtained respectively; PPDU1 and PPDU2 transmitted simultaneously meet an alignment requirement of end times of transmitting the PPDUs (a difference between an end time of PPDU1 and an end time of PPDU2≤8 μs, which may be considered as meeting the alignment requirement). After transmission of PPDU1 is completed, STA1 terminates TXOP1 in advance by sending a CF-End frame on the primary link, then STA2 also must terminate TXOP2 in advance, which is also achieved by sending a CF-End frame.

Figure 9:
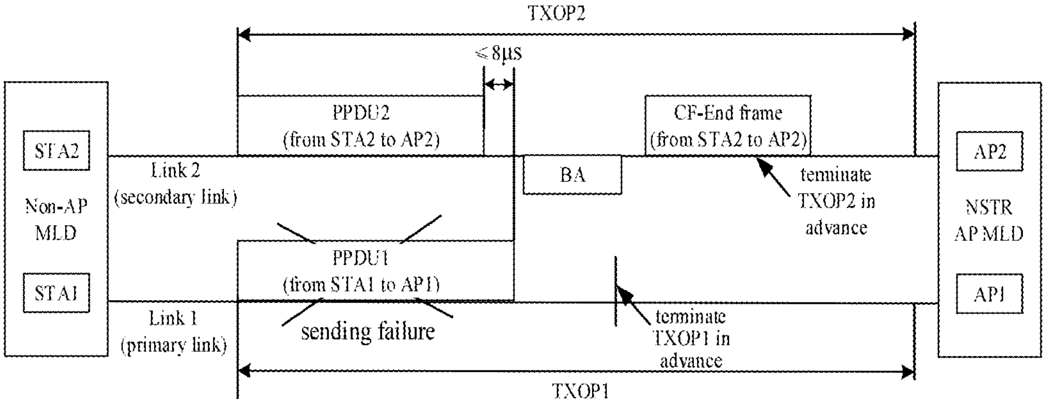

As shown in FIG. 9, in the Non-AP MLD associated with the NSTR AP MLD (such as the NSTR soft AP MLD or the NSTR mobile AP MLD), when STA1 affiliated to the Non-AP MLD obtains TXOP (set to be TXOP1) on the primary link, STA2 affiliated to the Non-AP MLD obtains TXOP (set to be TXOP2) on the secondary link, STA1 and STA2 start transmitting PPDUs simultaneously within TXOPs obtained respectively. Since the transmission of PPDU1 transmitted on the primary link is failed, STA1 restarts the backoff process after it does not receive ACK of PPDU1, and terminates TXOP1 in advance. Correspondingly, STA2 on the secondary link terminates TXOP2 in advance by way of sending a CF-End frame correspondingly.

Figure 10:
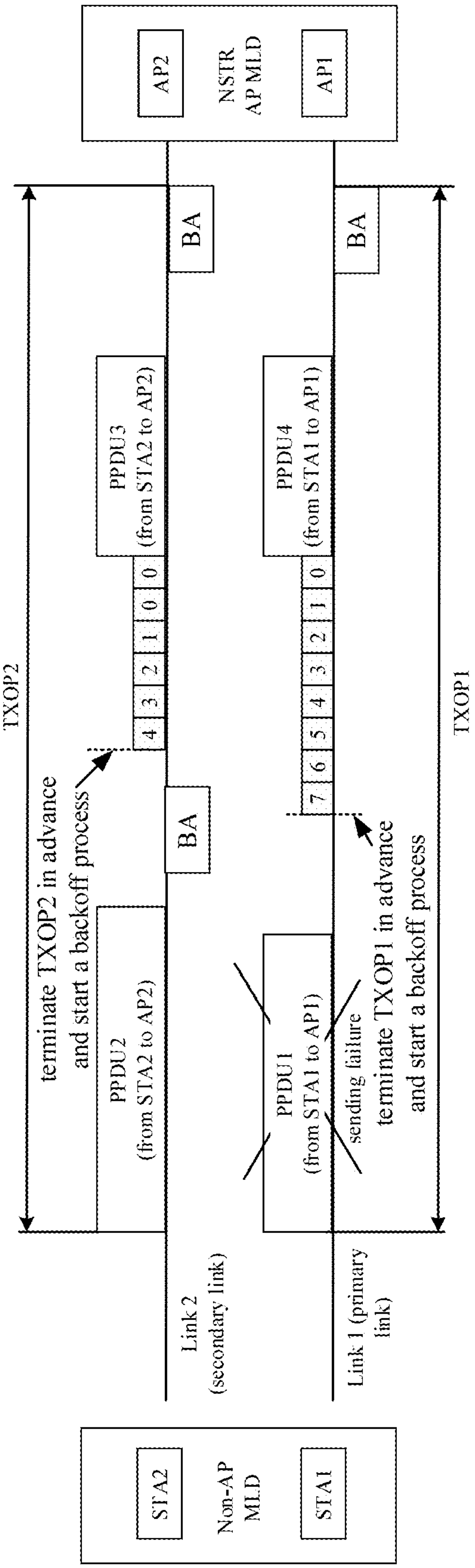

Third embodiment: STA1 corresponds to the above first Non-AP STA, STA2 corresponds to the above second Non-AP STA, TXOP1 corresponds to the above first TXOP, and TXOP2 corresponds to the above second TXOP. As shown in FIG. 10, in the Non-AP MLD associated with the NSTR AP MLD (such as the NSTR soft AP MLD or the NSTR mobile AP MLD), when STA1 affiliated to the Non-AP MLD obtains TXOP (set to be TXOP1) on the primary link, STA2 affiliated to the Non-AP MLD obtains TXOP (set to be TXOP2) on the secondary link, STA1 and STA2 start transmitting PPDUs simultaneously within TXOPs obtained respectively. Since the transmission of PPDU1 transmitted on the primary link is failed, STA1 restarts the backoff process after it does not receive ACK of PPDU1, and terminates TXOP1 in advance; correspondingly, when STA2 on the secondary link detects that STA1 on the primary link restarts the backoff process, STA2 also stops sending a next PPDU and restarts the backoff process; when STA2 backs off to zero and re-obtains TXOP, STA2 also starts transmitting PPDUs in a condition that STA1 has obtained TXOP and starts transmitting PPDUs. At the same time, transmission of PPDU3 and PPDU4 should meet an alignment requirement of end times of the PPDUs (a difference between an end time of PPDU3 and an end time of PPDU4≤8 μs, which may be considered as meeting the alignment requirement). In particular, for the PPDUs transmitted simultaneously on the primary link and the non-primary link, in order to ensure that STA2 on the secondary link may timely detect whether STA1 on the primary link fails to send PPDUs and performs corresponding operations, an expected end time point of a PPDU transmitted on the primary link and carrying a reply ACK frame is equal to or earlier than an end time point of a PPDU transmitted on the secondary link and carrying a reply ACK frame.

Figure 11:
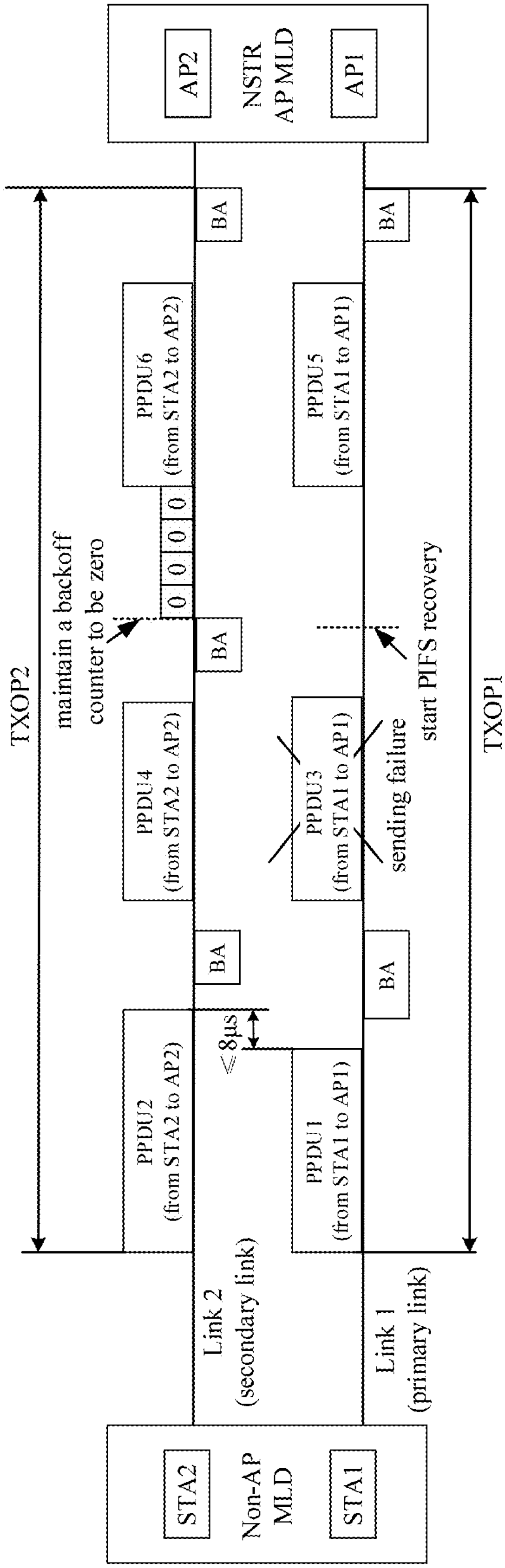

Fourth embodiment: as shown in FIG. 11, in the Non-AP MLD associated with the NSTR AP MLD (such as the NSTR soft AP MLD or the NSTR mobile AP MLD), when STA1 affiliated to the Non-AP MLD obtains TXOP (set to be TXOP1) on the primary link, STA2 affiliated to the Non-AP MLD obtains TXOP (set to be TXOP2) on the secondary link, STA1 and STA2 start transmitting PPDUs simultaneously within TXOPs obtained respectively. After STA1 fails to send PPDUs on the primary link, STA1 executes the PIFS recovery mechanism. Correspondingly, STA2 on the secondary link detects that STA1 on the primary link fails to send PPDUs and does not restart the backoff process, then STA2 stop sending a next PPDU, maintains the backoff counter to be zero, and waits for STA1 to execute the PIFS recovery mechanism and then start transmitting another PPDU. When the condition for triggering the backoff process does not occur and the channel is detected to be idle during a waiting duration when STA2 maintains the backoff counter to be zero, then in a case that STA1 executes the PIFS recovery mechanism and then starts transmitting another PPDU, it starts transmitting a next PPDU in the duration of TXOP originally obtained by STA2, while PPDUs transmitted on two links should meet an alignment requirement of end times of the PPDUs. For the PPDUs transmitted simultaneously on the primary link and the secondary link, in order to ensure that STA2 on the secondary link may timely detect whether STA1 on the primary link fails to send PPDUs and performs corresponding operations, an expected end time point of a PPDU transmitted on the primary link and carrying a reply ACK frame is equal to or earlier than an end time point of a PPDU transmitted on the secondary link and carrying a reply ACK frame.

Figure 12:
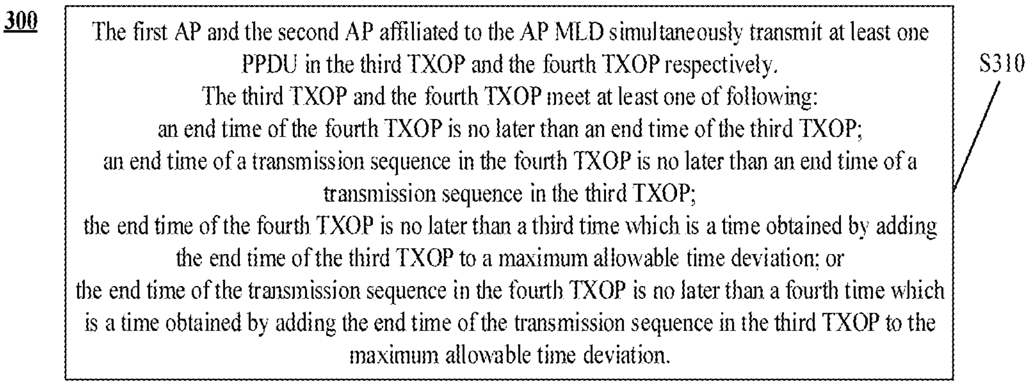
FIG. 12 is a schematic flowchart of another method for wireless communication according to an embodiment of the disclosure.

FIG. 12 is a schematic flowchart of a method for wireless communication 300 according to an embodiment of the disclosure. The method for wireless communication 300 is applied to an AP MLD, the AP MLD includes at least a first AP and a second AP affiliated to the AP MLD, the first AP operates on a primary link and obtains a third TXOP on the primary link, the second AP operates on a non-primary link and obtains a fourth TXOP on the non-primary link.

As shown in FIG. 12, the method for wireless communication 300 may include at least a part of the following contents.

At S310, the first AP and the second AP affiliated to the AP MLD simultaneously transmit at least one PPDU in the third TXOP and the fourth TXOP respectively.

The third TXOP and the fourth TXOP meet at least one of following:

an end time of the fourth TXOP is no later than an end time of the third TXOP;

an end time of a transmission sequence in the fourth TXOP is no later than an end time of a transmission sequence in the third TXOP;

the end time of the fourth TXOP is no later than a third time which is a time obtained by adding the end time of the third TXOP to a maximum allowable time deviation; or the end time of the transmission sequence in the fourth TXOP is no later than a fourth time which is a time obtained by adding the end time of the transmission sequence in the third TXOP to the maximum allowable time deviation.

In some embodiments, the maximum allowable time deviation is pre-configured or agreed on by a protocol.

In some embodiments, the maximum allowable time deviation is configured by the AP MLD.

In the embodiment of the disclosure, the non-primary link may also be referred to as secondary link. In the embodiment of the disclosure, the two terms may be replaced with each other.

In the embodiment of the disclosure, the first AP and the second AP may be APs affiliated to the AP MLD.

In some embodiments, "simultaneous transmission" may also be referred to as "synchronous transmission", that is, the above S310 may also be expressed as: the first AP and the second AP affiliated to the AP MLD synchronously transmit at least one PPDU in the third TXOP and the fourth TXOP respectively.

In some embodiments, the AP MLD is an NSTR AP MLD, and a link where the first AP is located and a link where the second AP is located belong to an NSTR link pair of the NSTR AP MLD.

In some embodiments, the NSTR AP MLD is an NSTR soft AP MLD or an NSTR mobile AP MLD.

In some embodiments, the NSTR AP MLD includes at least one NSTR link pair, one of the at least one NSTR link pair includes the primary link and the non-primary link.

In some embodiments, the AP MLD is associated with a Non-AP MLD, the Non-AP MLD at least includes a first Non-AP STA operating on the primary link and a second Non-AP STA operating on the non-primary link.

The first Non-AP STA and the second Non-AP STA may be STAs affiliated to the Non-AP MLD.

In some embodiments, a duration of the third TXOP completely overlaps with a duration of the fourth TXOP in a time domain; or, the duration of the third TXOP partially overlaps with the duration of the fourth TXOP in the time domain. Therefore, the first AP and the second AP affiliated to the AP MLD simultaneously transmit at least one PPDU in the third TXOP and the fourth TXOP respectively.

In some embodiments, a time when the second AP starts transmitting the PPDU in the fourth TXOP is not earlier than a time when the first AP starts transmitting the PPDU in the third TXOP.

In some embodiments, end times of PPDUs transmitted simultaneously on the primary link and the non-primary link meet an alignment requirement.

In some embodiments, the end times of the PPDUs transmitted simultaneously on the primary link and the non-primary link meeting the alignment requirement includes that: the end times of the PPDUs transmitted simultaneously on the primary link and the non-primary link are the same; or, a difference between the end times of the PPDUs transmitted simultaneously on the primary link and the non-primary link is less than or equal to a preset value. Therefore, it may be ensured that the NSTR-based interference or collision does not occur on the AP MLD or the Non-AP MLD.

For example, the preset value is 8 μs.

In some embodiments, the preset value is pre-configured or agreed on by a protocol.

In some embodiments, the preset value is configured by the AP MLD.

In some embodiments, for the PPDUs transmitted simultaneously on the primary link and the non-primary link, an end time of a PPDU transmitted on the primary link and carrying a reply ACK frame is not later than an end time of a PPDU transmitted on the non-primary link and carrying a reply ACK frame. Therefore, it may be ensured that transmission of a next PPDU may be started first on the primary link, compared to the non-primary link.

In some embodiments, in a case that the first AP fails to send PPDUs on the primary link, the first AP affiliated to the AP MLD restart a backoff process on the primary link.

In some embodiments, in a case that the second AP detects that the first AP restarts a backoff process on the primary link, the second AP affiliated to the AP MLD stops transmitting to-be-transmitted PPDUs on the non-primary link, and the second AP affiliated to the AP MLD restarts the backoff process on the non-primary link.

In some embodiments, in a case that the second AP detects that the first AP restarts a backoff process on the primary link, the second AP affiliated to the AP MLD transmits a CF-End frame on the non-primary link, the CF-End frame is configured to indicate early termination of the fourth TXOP.

In some embodiments, in a case that the first AP fails to send PPDUs on the primary link, the first AP affiliated to the AP MLD executes a PIFS recovery mechanism.

In some embodiments, in a case that the second AP detects that the first AP fails to send PPDUs on the primary link, the first AP does not restart a backoff process on the primary link, and the first AP executes a PIFS recovery mechanism: the second AP affiliated to the AP MLD stops transmitting to-be-transmitted PPDUs on the non-primary link, and the second AP affiliated to the AP MLD maintains a backoff counter thereof to be zero until the first AP starts transmitting PPDUs after executing the PIFS recovery mechanism.

In some embodiments, in a case that a condition for triggering the backoff process does not occur and the channel on the non-primary link is detected to be idle during a period when the second AP maintains the backoff counter thereof to be zero, the second AP affiliated to the AP MLD transmits PPDUs in the fourth TXOP, while the first AP transmits PPDUs on the primary link after executing the PIFS recovery mechanism.

After the first AP executes the PIFS recovery mechanism, end times of PPDUs transmitted simultaneously on the primary link and the non-primary link are the same; or, a difference between the end times of the PPDUs transmitted simultaneously on the primary link and the non-primary link is less than or equal to a preset value.

In some embodiments, in a case that a condition for triggering the backoff process occurs during a period when the second AP maintains the backoff counter thereof to be zero, the second AP affiliated to the AP MLD restarts the backoff process.

In some embodiments, in a case that a duration setting type used by the first AP in the third TXOP is single protection, a duration setting type used by the second AP in the fourth TXOP is also single protection.

In some embodiments, in a case that a duration setting type used by the first AP in the third TXOP is single protection, a duration setting type used by the second AP in the fourth TXOP is not allowed to be multiple-protection.

In some embodiments, in a case that a duration setting type used by the first AP in the third TXOP is multiple-protection, a duration setting type used by the second AP in the fourth TXOP is single protection or multiple-protection.

Therefore, in the embodiment of the disclosure, the third TXOP obtained by the first AP on the primary link and the fourth TXOP obtained by the second AP on the non-primary link are limited and constrained, so that the NSTR-based interference or collision is prevented from occurring on transmission of primary and secondary links when the first AP and the second AP affiliated to the AP MLD simultaneously transmit at least one PPDU in the third TXOP and the fourth TXOP respectively.

The technical solutions in the method for wireless communication 300 of the disclosure are described in detail below through fifth to eighth embodiments. Specifically, STA1 corresponds to the above first Non-AP STA, STA2 corresponds to the above second Non-AP STA, AP1 corresponds to the above first AP, AP2 correspond to the above second AP, TXOP3 corresponds to the above third TXOP, and TXOP4 corresponds to the above fourth TXOP.

The fifth embodiment corresponds to below solutions shown in FIG. 13 to FIG. 15.

Figure 13:
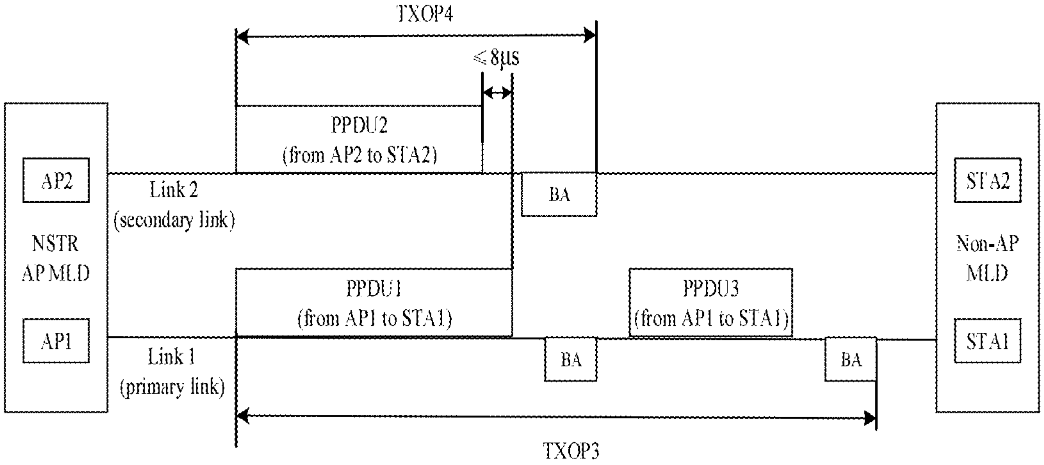
FIG. 13 to FIG. 19 are schematic diagrams of an AP MLD transmitting PPDUs on primary and secondary links according to an embodiment of the disclosure respectively.

As shown in FIG. 13, the Non-AP MLD is associated with the NSTR AP MLD (such as the NSTR soft AP MLD or the NSTR mobile AP MLD), AP1 affiliated to the NSTR AP MLD obtains TXOP (set to be TXOP3) on the primary link, AP2 affiliated to the NSTR AP MLD obtains TXOP (set to be TXOP4) on the secondary link, AP1 and AP2 start transmitting PPDUs simultaneously within TXOPs obtained respectively; PPDU1 and PPDU2 transmitted simultaneously meet an alignment requirement of end times of transmitting the PPDUs (a difference between end time of PPDU1 and end time of PPDU2≤8 μs, which may be considered as meeting the alignment requirement). Furthermore, a duration of TXOP3 obtained by AP1 is longer than a duration of TXOP4 obtained by AP2, and an end point time of TXOP3 is later than an end point time of TXOP4. Therefore, the NSTR-based interference or collision may be prevented from occurring on transmission of the NSTR AP MLD on the primary link and the secondary link.

Figure 14:
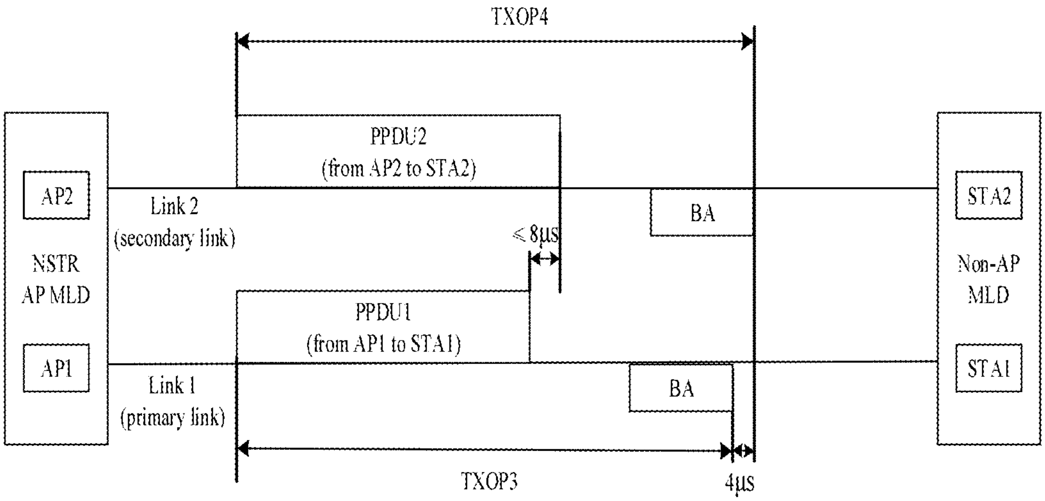

As shown in FIG. 14, the Non-AP MLD is associated with the NSTR AP MLD (such as the NSTR soft AP MLD or the NSTR mobile AP MLD), AP1 affiliated to the NSTR AP MLD obtains TXOP (set to be TXOP3) on the primary link, AP2 affiliated to the NSTR AP MLD obtains TXOP (set to be TXOP4) on the secondary link, AP1 and AP2 start transmitting PPDUs simultaneously within TXOPs obtained respectively; PPDU1 and PPDU2 transmitted simultaneously meet an alignment requirement of end times of transmitting the PPDUs (a difference between end time of PPDU1 and end time of PPDU2≤8 μs, which may be considered as meeting the alignment requirement). Furthermore, an end point time of TXOP4 obtained by AP2 is earlier than an end point time of TXOP3 obtained by AP1 plus a deviation threshold (set to be 8 μs). Therefore, the NSTR-based interference or collision may be prevented from occurring on transmission of the NSTR AP MLD on the primary link and the secondary link.

Figure 15:
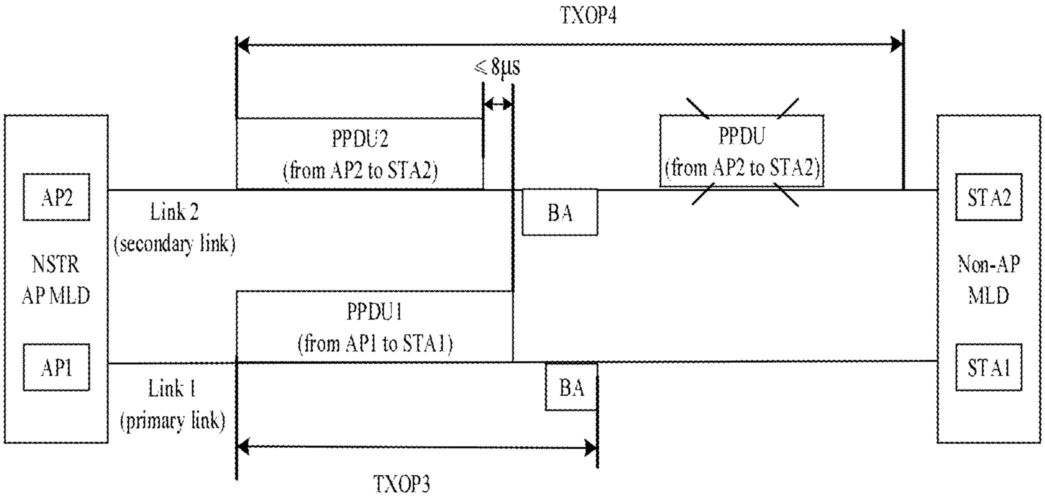

As shown in FIG. 15, the Non-AP MLD is associated with the NSTR AP MLD (such as the NSTR soft AP MLD or the NSTR mobile AP MLD), AP1 affiliated to the NSTR AP MLD obtains TXOP (set to be TXOP3) on the primary link, AP2 affiliated to the NSTR AP MLD obtains TXOP (set to be TXOP4) on the secondary link, an end point time of TXOP3 is earlier than an end point time of TXOP4, and a deviation between end point times of these two TXOPs is greater than a deviation threshold (set to be 8 μs). Therefore, the NSTR-based interference or collision may occur on transmission of the NSTR AP MLD on the primary link and the secondary link.

The sixth embodiment corresponds to below solutions shown in FIG. 16 to FIG. 17.

Figure 16:
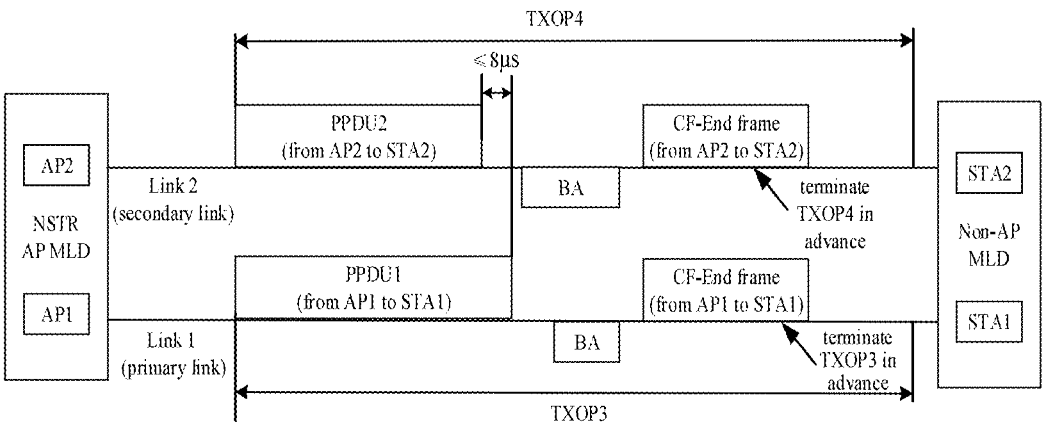

As shown in FIG. 16, the Non-AP MLD is associated with the NSTR AP MLD (such as the NSTR soft AP MLD or the NSTR mobile AP MLD), AP1 affiliated to the NSTR AP MLD obtains TXOP (set to be TXOP3) on the primary link, AP2 affiliated to the NSTR AP MLD obtains TXOP (set to be TXOP4) on the secondary link, AP1 and AP2 start transmitting PPDUs simultaneously within TXOPs obtained respectively; PPDU1 and PPDU2 transmitted simultaneously meet an alignment requirement of end times of transmitting the PPDUs (a difference between end time of PPDU1 and end time of PPDU2≤8 μs, which may be considered as meeting the alignment requirement). After transmission of PPDU1 finishes, AP1 terminates TXOP3 in advance by sending a CF-End frame on the primary link, then AP2 also must terminate TXOP4 in advance, which is also achieved by sending a CF-End frame.

Figure 17:
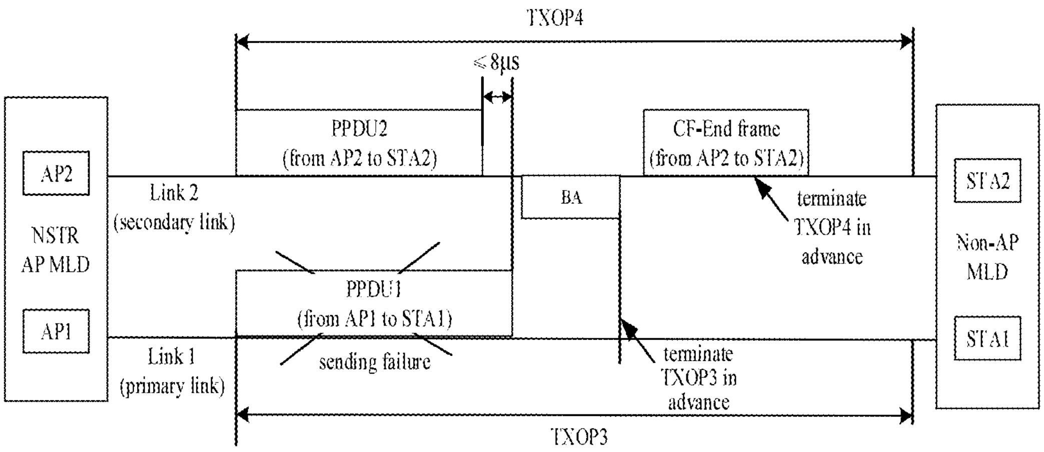

As shown in FIG. 17, the Non-AP MLD is associated with the NSTR AP MLD (such as the NSTR soft AP MLD or the NSTR mobile AP MLD), AP1 affiliated to the NSTR AP MLD obtains TXOP (set to be TXOP3) on the primary link, AP2 affiliated to the NSTR AP MLD obtains TXOP (set to be TXOP4) on the secondary link, AP1 and AP2 start transmitting PPDUs simultaneously within TXOPs obtained respectively. Since AP1 fails to send PPDU1 transmitted on the primary link, AP1 restarts the backoff process after it does not receive ACK of PPDU1, and terminates TXOP3 in advance. Correspondingly, AP2 on the secondary link terminates TXOP4 in advance by way of sending a CF-End frame correspondingly.

Figure 18:
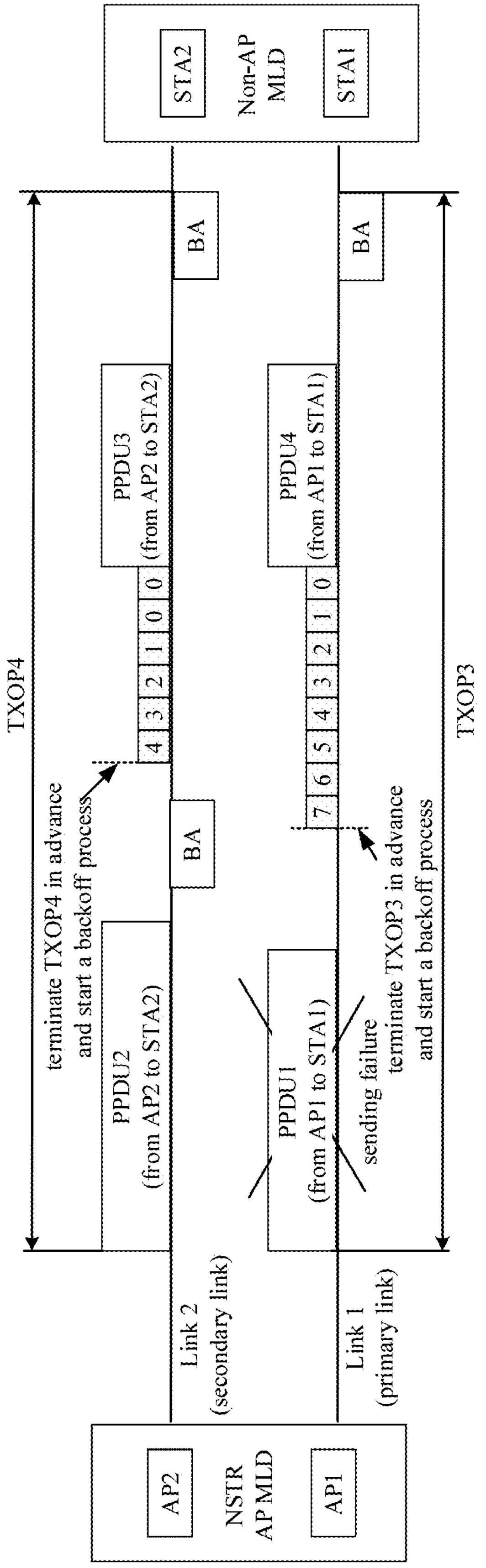

Seventh embodiment: as shown in FIG. 18, the Non-AP MLD is associated with the NSTR AP MLD (such as the NSTR soft AP MLD or the NSTR mobile AP MLD), AP1 affiliated to the NSTR AP MLD obtains TXOP (set to be TXOP3) on the primary link, AP2 affiliated to the NSTR AP MLD obtains TXOP (set to be TXOP4) on the secondary link, AP1 and AP2 start transmitting PPDUs simultaneously within TXOPs obtained respectively. Since AP1 fails to send PPDU1 on the primary link, AP1 restarts the backoff process after it does not receive ACK of PPDU1, and terminates TXOP3 in advance. Correspondingly, when AP2 on the secondary link detects that AP1 on the primary link restarts the backoff process, AP2 also stops sending a next PPDU and restarts the backoff process. When AP2 backs off to zero and re-obtains TXOP, AP2 also starts transmitting PPDUs in a condition that AP1 has obtained TXOP and starts transmitting PPDUs. At the same time, transmission of PPDU3 and PPDU4 should meet an alignment requirement of end times of the PPDUs (a difference between end time of PPDU3 and end time of PPDU4≤8 μs, which may be considered as meeting the alignment requirement). In particular, for the PPDUs transmitted simultaneously on the primary link and the non-primary link, in order to ensure that AP2 on the secondary link may timely detect whether AP1 on the primary link fails to send PPDUs and performs corresponding operations, an expected end time point of a PPDU transmitted on the primary link and carrying a reply ACK frame is equal to or earlier than an end time point of a PPDU transmitted on the secondary link and carrying a reply ACK frame.

Figure 19:
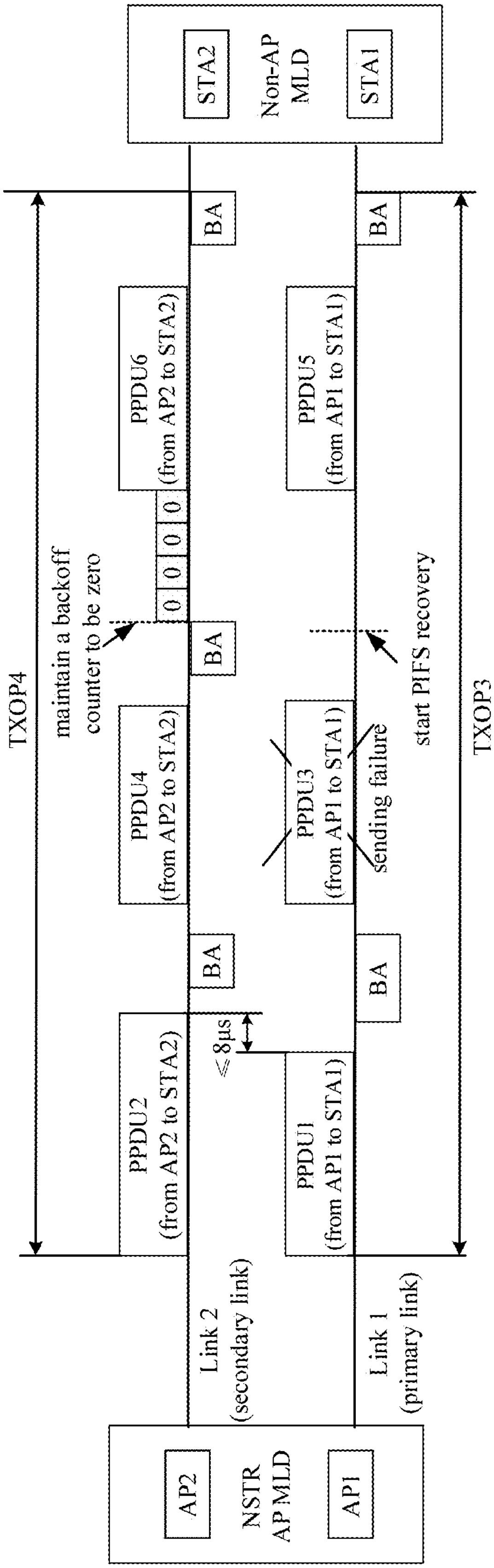

Eighth embodiment: as shown in FIG. 19, the Non-AP MLD is associated with the NSTR AP MLD (such as the NSTR soft AP MLD or the NSTR mobile AP MLD), AP1 affiliated to the NSTR AP MLD obtains TXOP (set to be TXOP3) on the primary link, AP2 affiliated to the NSTR AP MLD obtains TXOP (set to be TXOP4) on the secondary link, AP1 and AP2 start transmitting PPDUs simultaneously within TXOPs obtained respectively. After AP1 fails to send PPDUs on the primary link, AP1 executes the PIFS recovery mechanism. Correspondingly, AP2 on the secondary link detects that AP1 on the primary link fails to send PPDUs and does not restart the backoff process, then AP2 stop sending a next PPDU, maintains the backoff counter to be zero, and waits for AP1 to execute the PIFS recovery mechanism and then start transmitting another PPDU. When the condition for triggering the backoff process does not occur and the channel is detected to be idle during a waiting time when AP2 maintains the backoff counter to be zero, then in a case that AP executes the PIFS recovery mechanism and then starts transmitting another PPDU, it starts transmitting a next PPDU in the duration of TXOP originally obtained by AP2, while PPDUs transmitted on two links should meet an alignment requirement of end times of the PPDUs. For the PPDUs transmitted simultaneously on the primary link and the secondary link, in order to ensure that AP2 on the secondary link may timely detect whether AP1 on the primary link fails to send PPDUs and performs corresponding operations, an expected end time point of a PPDU transmitted on the primary link and carrying a reply ACK frame is equal to or earlier than an end time point of a PPDU transmitted on the secondary link and carrying a reply ACK frame.

Figure 20:
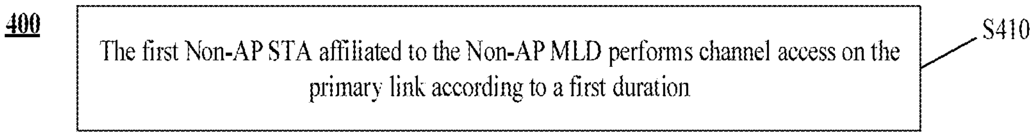
FIG. 20 is a schematic flowchart of yet another method for wireless communication according to an embodiment of the disclosure.

FIG. 20 is a schematic flowchart of a method for wireless communication 400 according to an embodiment of the disclosure. The method for wireless communication 400 is applied to a Non-AP MLD, the Non-AP MLD includes at least a first Non-AP STA and a second Non-AP STA affiliated to the Non-AP MLD, the first Non-AP STA operates on a primary link, the second Non-AP STA operates on a non-primary link.

As shown in FIG. 20, the method for wireless communication 400 may include at least a part of the following contents.

At S410, the first Non-AP STA affiliated to the Non-AP MLD performs channel access on the primary link according to a first duration.

Figure 21:
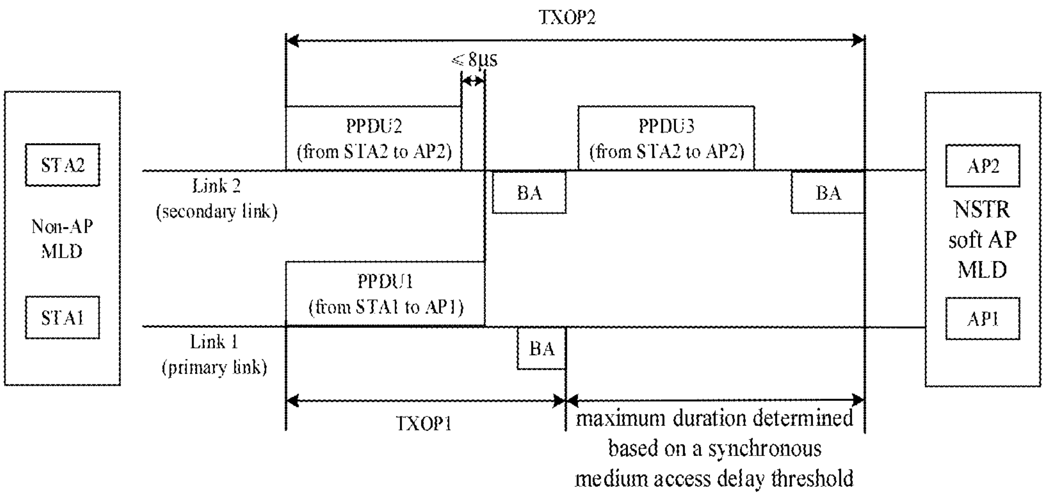
FIG. 21 is a schematic diagram showing a later end time of TXOP on a secondary link according to an embodiment of the disclosure.
Figure 22:
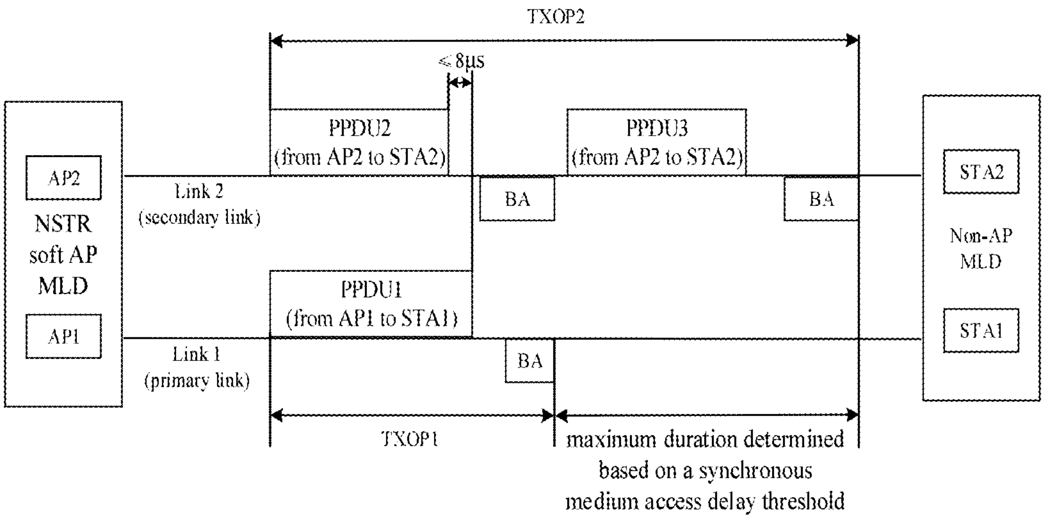
FIG. 22 is a schematic diagram showing another later end time of TXOP on a secondary link according to an embodiment of the disclosure

It should be noted that one Non-AP MLD is associated with one NSTR AP MLD (such as an NSTR soft AP MLD or an NSTR mobile AP MLD), and two APs (AP1 on the primary link and AP2 on the secondary link) affiliated to the NSTR AP MLD or two STAs (STA1 on the primary link or STA2 on the secondary link) affiliated to the Non-AP MLD obtain TXOPs and start simultaneous transmission. When an end time of TXOP on the secondary link is allowed to be later than an end time of TXOP on the primary link, in a case that a third STA (STA3) located on the primary link and associated with the NSTR AP MLD (for example, STA3 is associated with AP1 in the NSTR AP MLD) directly sends PPDUs after obtaining TXOP, it may cause interference or collision on the NSTR AP MLD side with transmission that is still ongoing on the secondary link. In order to prevent occurrence of the collision, a channel access solution based on synchronous medium access delay is proposed. Specifically, a scenario where the end time of the TXOP on the secondary link is later may be shown in FIG. 21 and FIG. 22, in which the end time of the TXOP on the secondary link is later than the end time of the TXOP on the primary link, a deviation between the two end times is less than or equal to a threshold, and the threshold is set as a synchronous medium access delay threshold (synMediumAccessDelayThreshold).

In the embodiment of the disclosure, the non-primary link may also be referred to as a secondary link. In the embodiment of the disclosure, the two terms may be replaced with each other.

In the embodiment of the disclosure, the first Non-AP STA and the second Non-AP STA may be STAs affiliated to the Non-AP MLD.

In some embodiments, "simultaneous transmission" may also be referred to as "synchronous transmission".

In some embodiments, the Non-AP MLD is associated with an NSTR AP MLD, the NSTR AP MLD includes at least a first AP operating on the primary link and a second AP operating on the non-primary link, and a link where the first AP is located and a link where the second AP is located belong to an NSTR link pair of the NSTR AP MLD.

The first AP and the second AP may be APs affiliated to the NSTR AP MLD.

In some embodiments, the NSTR AP MLD is an NSTR soft AP MLD or an NSTR mobile AP MLD.

In some embodiments, the NSTR AP MLD includes at least one NSTR link pair, one of the at least one NSTR link pair includes the primary link and the non-primary link.

In some embodiments, a start time of the first duration is a time when a backoff counter of the first Non-AP STA backs off to zero, and the first duration is less than or equal to a synchronous medium access delay threshold.

In some embodiments, the synchronous medium access delay threshold (synMediumAccessDelayThreshold) indicates a maximum value of a difference between an end time of a TXOP obtained on the non-primary link and an end time of a TXOP obtained on the primary link, in a case that the end time of the TXOP obtained on the non-primary link is later than the end time of the TXOP obtained on the primary link.

In some embodiments, the synchronous medium access delay threshold is pre-configured or agreed on by a protocol.

In some embodiments, the synchronous medium access delay threshold is configured by an AP MLD. For example, the AP MLD associated with the Non-AP MLD configures the synchronous medium access delay threshold for the Non-AP MLD.

In some embodiments, the above S410 may specifically include the following operations.

The first Non-AP STA affiliated to the Non-AP MLD maintains the backoff counter thereof to be zero after the backoff counter of the first Non-AP STA backs off to zero.

When a condition for triggering the first Non-AP STA to back off again does not occur and the second Non-AP STA obtains a TXOP in the first duration, the first Non-AP STA affiliated to the Non-AP MLD starts transmitting PPDUs when medium is idle.

In some embodiments, "medium is idle" may also be expressed as "channel is idle", the two terms may be replaced with each other.

In some embodiments, when the first Non-AP STA starts transmitting PPDUs, the second Non-AP STA also starts transmitting PPDUs, and the second Non-AP STA and the first Non-AP STA transmit PPDUs synchronously. Therefore, it may be ensured that the NSTR-based interference or collision does not occur on the NSTR AP MLD or the Non-AP MLD.

In some embodiments, the second Non-AP STA and the first Non-AP STA transmitting PPDUs synchronously includes that the second Non-AP STA and the first Non-AP STA transmitting PPDUs synchronously includes that the second Non-AP STA and the first Non-AP STA transmit PPDUs simultaneously, and the PPDUs transmitted simultaneously meet an alignment requirement of end times thereof.

In some embodiments, the above S410 may specifically include the following operations.

The first Non-AP STA affiliated to the Non-AP MLD maintains the backoff counter thereof to be zero after the backoff counter of the first Non-AP STA backs off to zero.

When the second Non-AP STA does not obtain a TXOP in the first duration until a condition for triggering the first Non-AP STA to back off again occurs, the first Non-AP STA affiliated to the Non-AP MLD restarts a backoff process.

In some embodiments, the above S410 may specifically include the following operations.

The first Non-AP STA affiliated to the Non-AP MLD maintains the backoff counter thereof to be zero after the backoff counter of the first Non-AP STA backs off to zero.

The first Non-AP STA affiliated to the Non-AP MLD starts transmitting PPDUs when medium is idle after the first duration, when a condition for triggering the first Non-AP STA to back off again does not occur and the second Non-AP STA does not obtain a TXOP in the first duration.

In some embodiments, the above S410 may specifically include the following operations.

The first Non-AP STA affiliated to the Non-AP MLD sends a CTS (Clear To Send)-to-self frame on the primary link in the first duration, when the backoff counter of the first Non-AP STA backs off to zero and medium is idle.

The first Non-AP STA affiliated to the Non-AP MLD starts transmitting PPDUs when medium is idle, when a condition for triggering the first Non-AP STA to back off again does not occur and the second Non-AP STA obtains a TXOP in a first waiting duration.

A start time of the first waiting duration is a time with an interval of a short interframe space (SIFS) from a time that the first Non-AP STA finishes sending the CTS-to-self frame, and an end time of the first waiting duration is an end time of the first duration.

In some embodiments, when the first Non-AP STA starts transmitting PPDUs, the second Non-AP STA also starts transmitting PPDUs, and the second Non-AP STA and the first Non-AP STA transmit PPDUs synchronously. Therefore, it may be ensured that the NSTR-based interference or collision does not occur on the NSTR AP MLD or the Non-AP MLD.

In some embodiments, the above S410 may specifically include the following operations.

The first Non-AP STA affiliated to the Non-AP MLD sends a CTS-to-self frame on the primary link in the first duration, when the backoff counter of the first Non-AP STA backs off to zero and medium is idle.

When the second Non-AP STA does not obtain a TXOP in a first waiting duration until a condition for triggering the first Non-AP STA to back off again occurs, the first Non-AP STA affiliated to the Non-AP MLD restarts a backoff process.

A start time of the first waiting duration is a time with an interval of a SIFS from a time that the first Non-AP STA finishes sending the CTS-to-self frame, and an end time of the first waiting duration is an end time of the first duration.

In some embodiments, the above S410 may specifically include the following operations.

The first Non-AP STA affiliated to the Non-AP MLD sends a CTS-to-self frame on the primary link in the first duration, when the backoff counter of the first Non-AP STA backs off to zero and medium is idle.

The first Non-AP STA affiliated to the Non-AP MLD starts transmitting PPDUs when the medium is idle after a first waiting duration, in a case that a condition for triggering the first Non-AP STA to back off again does not occur and the second Non-AP STA does not obtain a TXOP in the first waiting duration.

A start time of the first waiting duration is a time with an interval of a SIFS from a time that the first Non-AP STA finishes sending the CTS-to-self frame, and an end time of the first waiting duration is an end time of the first duration.

In some embodiments, the above S410 may specifically include the following operations.

The first Non-AP STA affiliated to the Non-AP MLD sends at least one request-to-send (RTS) frame in the first duration, and the first Non-AP STA receives a CTS frame after a SIFS elapses from the sending of the at least one RTS frame is completed. The first Non-AP STA affiliated to the Non-AP MLD starts transmitting PPDUs.

In some embodiments, in a case that the second Non-AP STA obtains a TXOP: when the first Non-AP STA starts transmitting PPDUs, the second Non-AP STA also starts transmitting PPDUs, and the second Non-AP STA and the first Non-AP STA transmit PPDUs synchronously. Therefore, it may be ensured that the NSTR-based interference or collision does not occur on the NSTR AP MLD or the Non-AP MLD.

In some embodiments, the above S410 may specifically include the following operations.

The first Non-AP STA affiliated to the Non-AP MLD sends at least one RTS frame in the first duration, when the backoff counter of the first Non-AP STA backs off to zero and medium is idle, and the first Non-AP STA does not receive a CTS frame.

The first Non-AP STA affiliated to the Non-AP MLD starts transmitting PPDUs when the medium is idle, in a case that a condition for triggering the first Non-AP STA to back off again does not occur and the second Non-AP STA obtains a TXOP in the first duration.

In some embodiments, when the first Non-AP STA starts transmitting PPDUs, the second Non-AP STA also starts transmitting PPDUs, and the second Non-AP STA and the first Non-AP STA transmit PPDUs synchronously.

In some embodiments, the above S410 may specifically include the following operations.

The first Non-AP STA affiliated to the Non-AP MLD sends at least one RTS frame in the first duration, when the backoff counter of the first Non-AP STA backs off to zero and medium is idle, and the first Non-AP STA does not receive a CTS frame.

The first Non-AP STA affiliated to the Non-AP MLD restarts a backoff process when until a condition for triggering the first Non-AP STA to back off again occurs, the second Non-AP STA does not obtain a TXOP in the first duration.

In some embodiments, the above S410 may specifically include the following operations.

The first Non-AP STA affiliated to the Non-AP MLD sends at least one RTS frame in the first duration, when the backoff counter of the first Non-AP STA backs off to zero and medium is idle, and the first Non-AP STA does not receive a CTS frame.

The first Non-AP STA affiliated to the Non-AP MLD starts transmitting PPDUs when the medium is idle after the first duration, in a case that a condition for triggering the first Non-AP STA to back off again does not occur and the second Non-AP STA does not obtain a TXOP in the first duration.

Therefore, in the embodiment of the disclosure, the first Non-AP STA performs channel access on the primary link according to the first duration, so that the NSTR-based interference or collision may be prevented from occurring on transmission of primary and secondary links.

The technical solutions in the method for wireless communication 400 of the disclosure are described in detail below through ninth to eleventh embodiments. Specifically, STA1 corresponds to the above first Non-AP STA, STA2 corresponds to the above second Non-AP STA, AP1 corresponds to the above first AP, AP2 correspond to the above second AP.

Figure 23:
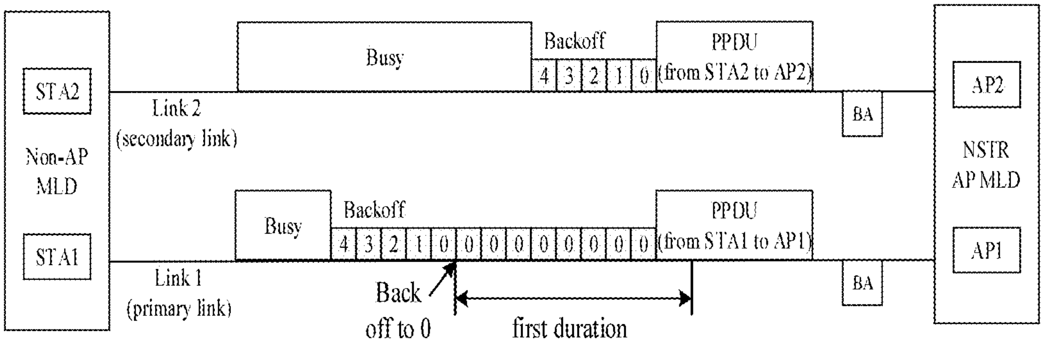
FIG. 23 to FIG. 25 are schematic diagrams of a Non-AP MLD transmitting PPDUs on primary and secondary links according to an embodiment of the disclosure respectively.

Ninth embodiment: as shown in FIG. 23, the Non-AP MLD is associated with the NSTR soft AP MLD, the NSTR soft AP MLD is affiliated with two APs (AP1 on the primary link and AP2 on the secondary link), and the Non-AP MLD is affiliated with two STAs (STA1 on the primary link and STA2 on the secondary link). STA1 chooses not to transmit data when the backoff counter thereof reaches zero, and maintains the backoff counter thereof to be zero in the first duration, the start time of the first duration is a time when the backoff counter of STA1 reaches zero, the first duration is for example a maximum value determined based on synMediumAccessDelayThreshold. In the first duration, when the condition for triggering STA1 to back off again does not occur and STA2 obtains a TXOP, then STA1 starts transmitting PPDUs when the medium is idle, and STA2 may also start transmitting PPDUs after STA1 starts transmission, thus STA1 and STA2 transmit PPDUs synchronously to ensure that the NSTR-based interference does not occur.

Figure 24:
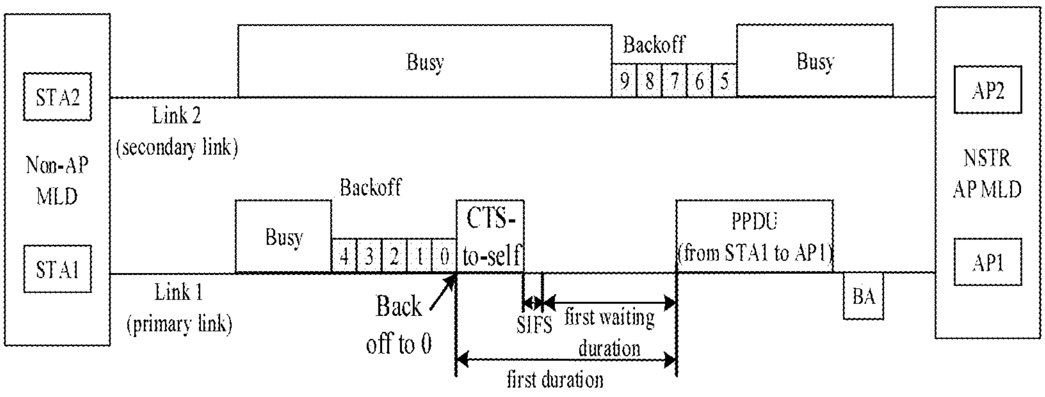

Tenth embodiment: as shown in FIG. 24, the Non-AP MLD is associated with the NSTR soft AP MLD, the NSTR soft AP MLD is affiliated with two APs (AP1 on the primary link and AP2 on the secondary link), and the Non-AP MLD is affiliated with two STAs (STA1 on the primary link and STA2 on the secondary link). STA1 sends the CTS-to-self frame first in the first duration, when the backoff counter thereof reaches zero and medium is idle; when STA2 does not obtain a TXOP after the SIFS elapses from the sending of the CTS-to-self frame being completed, then STA1 waits in the first waiting duration. The start time of the first duration is a time when the backoff counter of STA1 reaches zero, the first duration is for example a maximum value determined based on synMediumAccessDelayThreshold, the start time of the first waiting duration is a time with an interval of the SIFS from a time that STA1 finishes sending the CTS-to-self frame, and the end time of the first waiting duration is the end time of the first duration. When STA1 waits in the first waiting duration, STA2 does not obtain the TXOP and the condition for triggering STA1 to back off again does not occur, then STA1 starts transmitting PPDUs when the medium is idle, after waiting for the first waiting duration.

Figure 25:
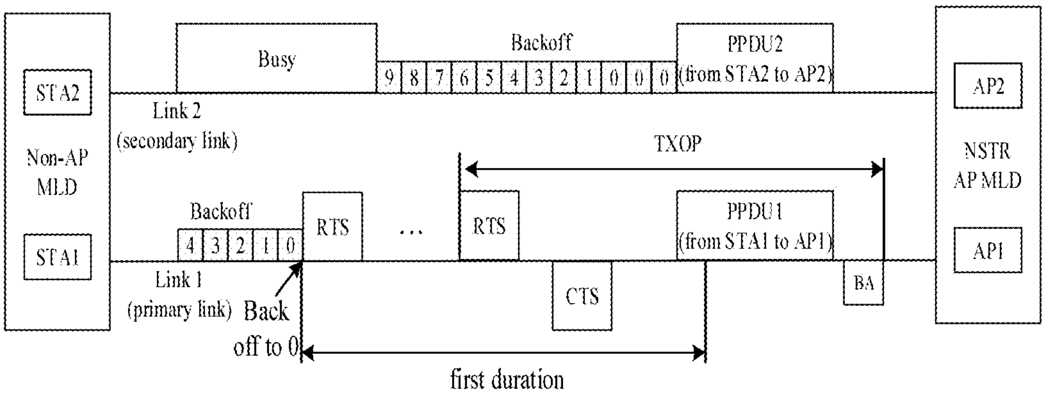

Eleventh embodiment: as shown in FIG. 25, the Non-AP MLD is associated with the NSTR soft AP MLD, the NSTR soft AP MLD is affiliated with two APs (AP1 on the primary link and AP2 on the secondary link), and the Non-AP MLD is affiliated with two STAs (STA1 on the primary link and STA2 on the secondary link). In the first duration, STA1 may send one or more RTS frames to AP1 so as to obtain a TXOP, and when STA1 receives CTS after the SIFS elapses from the sending of one of RTS frames is completed, STA1 directly starts transmitting PPDUs. The start time of the first duration is a time when the backoff counter of STA1 reaches zero, the first duration is for example a maximum value determined based on synMediumAccessDelayThreshold. When STA2 obtains a TXOP, STA1 and STA2 may transmit synchronously.

Figure 26:
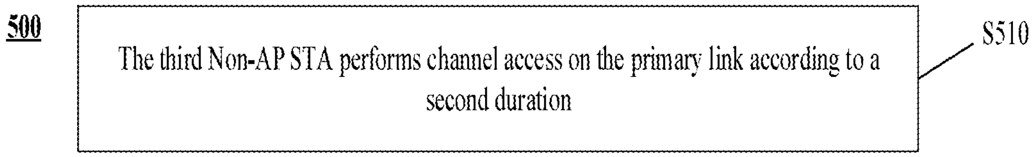
FIG. 26 is a schematic flowchart of still another method for wireless communication according to an embodiment of the disclosure.

FIG. 26 is a schematic flowchart of a method for wireless communication 500 according to an embodiment of the disclosure. The method for wireless communication 500 is applied to a third Non-AP STA, the third Non-AP STA is associated with an AP MLD, the AP MLD includes at least a first AP and a second AP affiliated to the AP MLD, the third Non-AP STA and the first AP operate on a primary link, the second AP operates on a non-primary link.

As shown in FIG. 26, the method for wireless communication 500 may include at least a part of the following contents.

At S510, the third Non-AP STA performs channel access on the primary link according to a second duration.

It should be noted that a Non-AP MLD is associated with an NSTR AP MLD (such as an NSTR soft AP MLD or an NSTR mobile AP MLD), and two APs (AP1 on the primary link and AP2 on the secondary link) affiliated to the NSTR AP MLD or two STAs (STA1 on the primary link or STA2 on the secondary link) affiliated to the Non-AP MLD obtain TXOPs and start simultaneous transmission. When an end time of TXOP on the secondary link is allowed to be later than an end time of TXOP on the primary link, in a case that a third STA (STA3) located on the primary link and associated with the NSTR AP MLD (for example, STA3 is associated with AP1 in the NSTR AP MLD) directly sends PPDUs after obtaining TXOP, it may cause interference or collision on the NSTR AP MLD side with transmission that is still ongoing on the secondary link. In order to prevent occurrence of the collision, a channel access solution based on synchronous medium access delay is proposed. Specifically, a scenario where the end time of the TXOP on the secondary link is later may be shown in FIG. 21 and FIG. 22, in which the end time of the TXOP on the secondary link is later than the end time of the TXOP on the primary link, a deviation between the two end times is less than or equal to a threshold, and the threshold is set as a synchronous medium access delay threshold (synMediumAccessDelayThreshold).

In the embodiment of the disclosure, the non-primary link may also be referred to as a secondary link. In the embodiment of the disclosure, the two terms may be replaced with each other.

In some embodiments, "simultaneous transmission" may also be referred to as "synchronous transmission".

In some embodiments, the AP MLD is an NSTR AP MLD, and a link where the first AP is located and a link where the second AP is located belong to an NSTR link pair of the NSTR AP MLD.

In some embodiments, the NSTR AP MLD is an NSTR soft AP MLD or an NSTR mobile AP MLD.

In some embodiments, the NSTR AP MLD includes at least one NSTR link pair, one of the at least one NSTR link pair includes the primary link and the non-primary link.

In some embodiments, the AP MLD may also be associated with a Non-AP MLD, the Non-AP MLD at least includes a first Non-AP STA operating on the primary link and a second Non-AP STA operating on the non-primary link.

The first Non-AP STA and the second Non-AP STA may be STAs affiliated to the Non-AP MLD.

In some embodiments, a start time of the second duration is a time when a backoff counter of the first Non-AP STA backs off to zero, and the second duration is less than or equal to a synchronous medium access delay threshold.

In some embodiments, the synchronous medium access delay threshold (synMediumAccessDelayThreshold) indicates a maximum value of a difference between an end time of a TXOP obtained on the non-primary link and an end time of a TXOP obtained on the primary link, in a case that the end time of the TXOP obtained on the non-primary link is later than the end time of the TXOP obtained on the primary link.

In some embodiments, the synchronous medium access delay threshold is pre-configured or agreed on by a protocol; or, the synchronous medium access delay threshold is configured by the AP MLD.

In some embodiments, the above S510 may specifically include the following operations.

The third Non-AP STA maintains the backoff counter thereof to be zero after the backoff counter of the third Non-AP STA backs off to zero.

The third Non-AP STA restarts a backoff process when a condition for triggering the third Non-AP STA to back off again occurs in the second duration.

In some embodiments, the above S510 may specifically include the following operations.

The third Non-AP STA maintains the backoff counter thereof to be zero after the backoff counter of the third Non-AP STA backs off to zero.

The third Non-AP STA starts transmitting PPDUs when medium is idle after the second duration, when a condition for triggering the third Non-AP STA to back off again does not occur in the second duration.

In some embodiments, the above S510 may specifically include the following operations.

The third Non-AP STA sends CTS to a CTS-to-self frame on the primary link in the second duration, when the backoff counter of the third Non-AP STA backs off to zero and medium is idle.

The third Non-AP STA restarts a backoff process when a condition for triggering the third Non-AP STA to back off again occurs in a second waiting duration.

A start time of the second waiting duration is a time with an interval of a SIFS from a time that the third Non-AP STA finishes sending the CTS to the CTS-to-self frame, and an end time of the second waiting duration is an end time of the second duration.

In some embodiments, the above S510 may specifically include the following operations.

The third Non-AP STA sends a CTS-to-self frame on the primary link in the first duration, when the backoff counter of the third Non-AP STA backs off to zero and medium is idle.

The third Non-AP STA starts transmitting PPDUs when the medium is idle after a second waiting duration, in a case that a condition for triggering the first Non-AP STA to back off again does not occur in the second waiting duration.

A start time of the second waiting duration is a time with an interval of a SIFS from a time that the third Non-AP STA finishes sending the CTS-to-self frame, and an end time of the second waiting duration is an end time of the second duration.

In some embodiments, the above S510 may specifically include the following operations.

The third Non-AP STA sends at least one RTS frame in the second duration, when the backoff counter of the third Non-AP STA backs off to zero and medium is idle, and the third Non-AP STA receives a CTS frame after a SIFS elapses from the sending of the at least one RTS frame is completed.

The third Non-AP STA starts transmitting PPDUs.

In some embodiments, the above S510 may specifically include the following operations.

The third Non-AP STA sends at least one RTS frame in the second duration, when the backoff counter of the third Non-AP STA backs off to zero and medium is idle, and the third Non-AP STA does not receive a CTS frame.

The third Non-AP STA restarts a backoff process when a condition for triggering the first Non-AP STA to back off again occurs in the second duration.

In some embodiments, the above S510 may specifically include the following operations.

The third Non-AP STA sends at least one RTS frame in the second duration, when the backoff counter of the third Non-AP STA backs off to zero and medium is idle, and the third Non-AP STA does not receive a CTS frame.

The third Non-AP STA starts transmitting PPDUs when the medium is idle after the first duration, in a case that a condition for triggering the first Non-AP STA to back off again does not occur in the second duration.

Therefore, in the embodiment of the disclosure, the third Non-AP STA performs channel access on the primary link according to the second duration, so that the NSTR-based interference or collision may be prevented from occurring on transmission of primary and secondary links.

The technical solutions in the method for wireless communication 500 of the disclosure are described in detail below through twelfth to fourteenth embodiments. Specifically, STA1 corresponds to the above first Non-AP STA, STA2 corresponds to the above second Non-AP STA, STA3 corresponds to the above third Non-AP STA, AP1 corresponds to the above first AP, AP2 corresponds to the above second AP.

Figure 27:
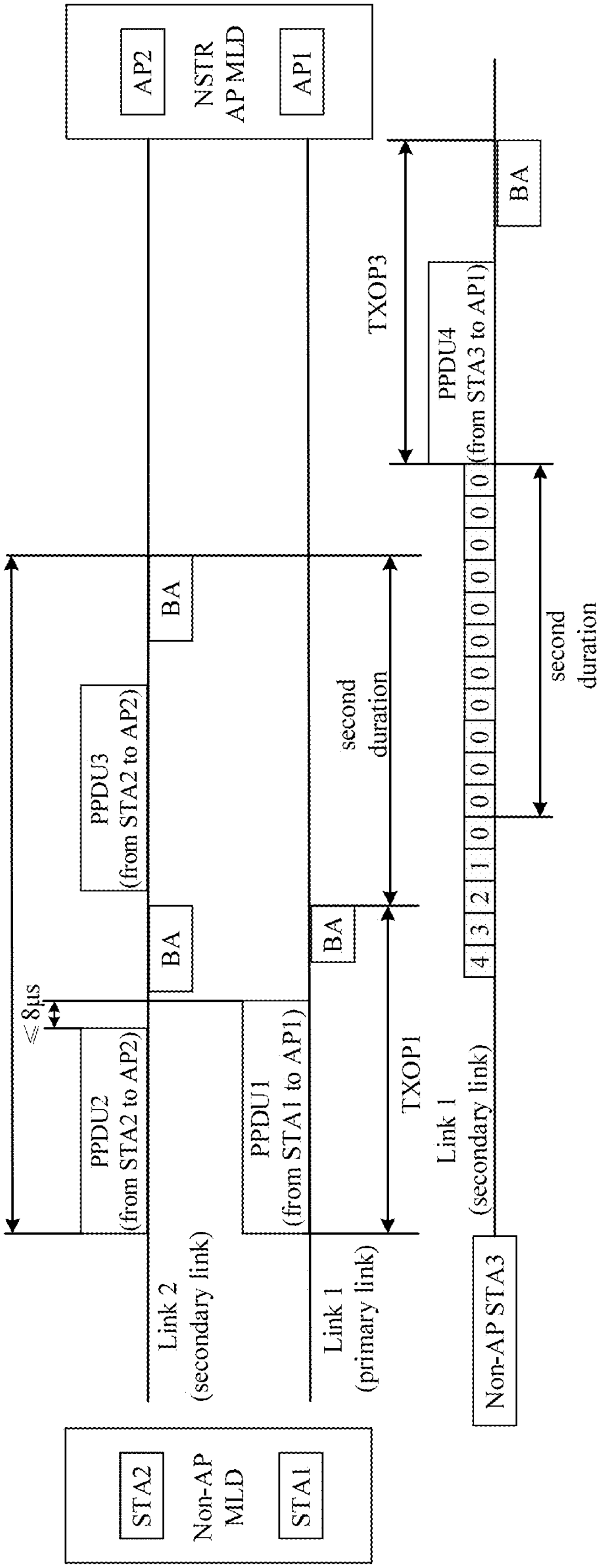
FIG. 27 to FIG. 29 are schematic diagrams of a third Non-AP STA (STA3) transmitting PPDUs on a primary link according to an embodiment of the disclosure respectively.

Twelfth embodiment: as shown in FIG. 27, the Non-AP MLD is associated with the NSTR soft AP MLD, the NSTR soft AP MLD is affiliated with two APs (AP1 on the primary link and AP2 on the secondary link), and the Non-AP MLD is affiliated with two STAs (STA1 on the primary link and STA2 on the secondary link). An independent Non-AP STA (STA3 on the primary link) associated with the affiliated AP1 in the NSTR soft AP MLD chooses not to transmit data when the backoff counter thereof reaches zero, and maintains the backoff counter thereof to be zero in the second duration. The start time of the second duration is a time when the backoff counter of STA3 reaches zero, the second duration is for example a maximum value determined based on synMediumAccessDelayThreshold. In the second duration, when the condition for triggering STA3 to back off again does not occur, then STA3 starts transmission when the medium is idle after waiting for a time corresponding to a synchronous channel access delay threshold.

Figure 28:
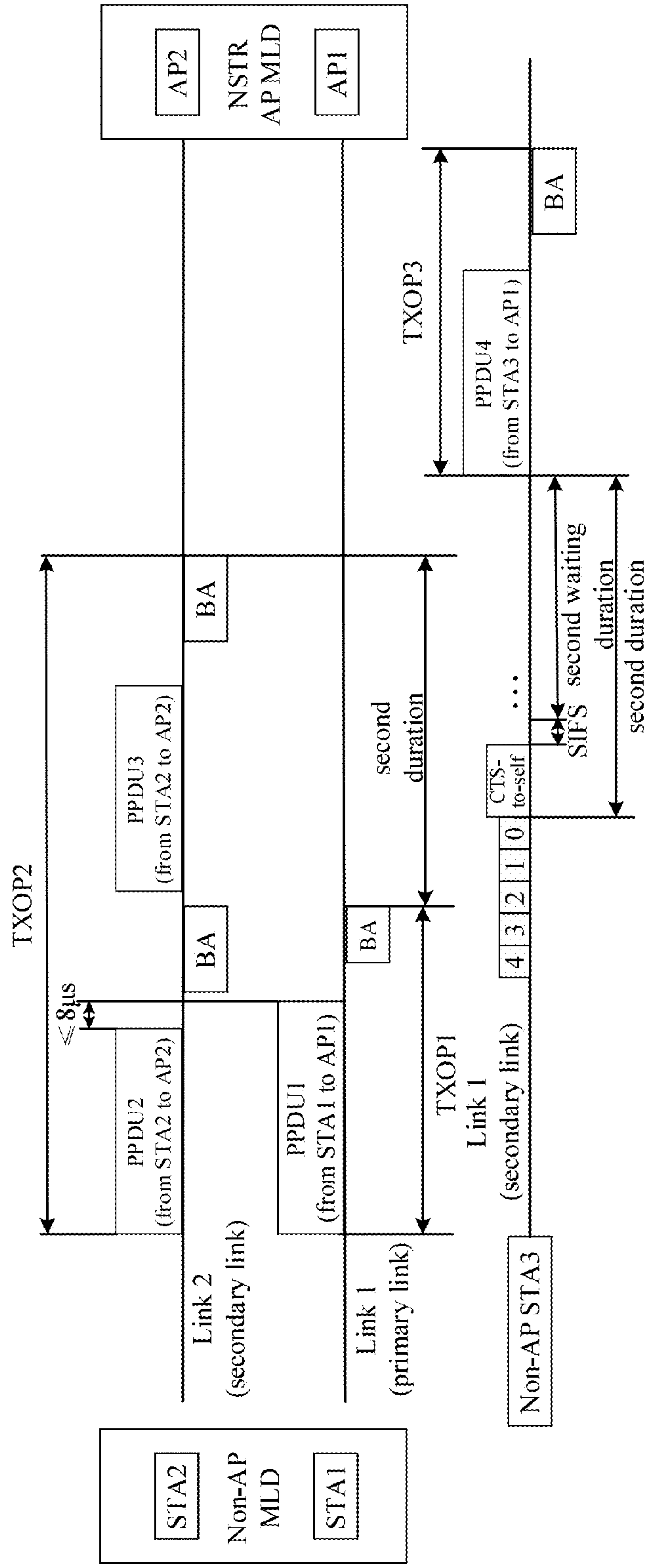

Thirteenth embodiment: as shown in FIG. 28, the Non-AP MLD is associated with the NSTR soft AP MLD, the NSTR soft AP MLD is affiliated with two APs (AP1 on the primary link and AP2 on the secondary link), and the Non-AP MLD is affiliated with two STAs (STA1 on the primary link and STA2 on the secondary link). An independent Non-AP STA (STA3 on the primary link) associated with the affiliated AP1 in the NSTR soft AP MLD sends the CTS-to-self frame first in the second duration, when the backoff counter thereof reaches zero and medium is idle. After the SIFS elapses from the sending of the CTS-to-self frame is completed, STA3 waits during the second waiting duration. The start time of the second duration is a time when the backoff counter of STA3 reaches zero, the second duration is for example a maximum value determined based on synMediumAccessDelayThreshold, the start time of the second waiting duration is a time with an interval of the SIFS from a time that STA3 finishes sending the CTS-to-self frame, and the end time of the second waiting duration is the end time of the second duration. During the STA3 is waiting in the second waiting duration, if the condition for triggering STA3 to back off again does not occur, then after waiting for a time corresponding to a waiting time threshold, STA3 starts transmission when the medium is idle.

Figure 29:
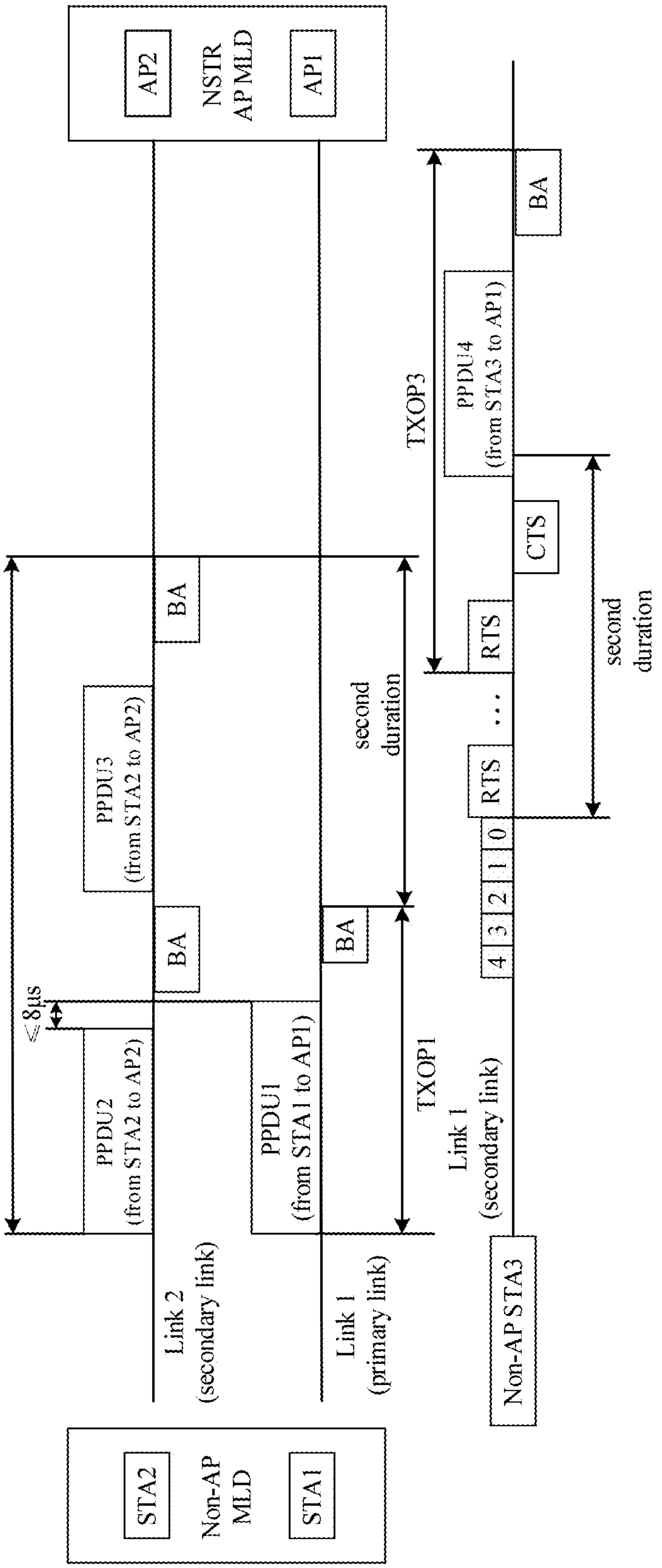

Fourteenth embodiment: as shown in FIG. 29, the Non-AP MLD is associated with the NSTR soft AP MLD, the NSTR soft AP MLD is affiliated with two APs (AP1 on the primary link and AP2 on the secondary link), and the Non-AP MLD is affiliated with two STAs (STA1 on the primary link and STA2 on the secondary link). In the second duration, STA3 may send one or more RTS frames to AP1 so as to obtain a TXOP, and when STA3 receives CTS after the SIFS elapses from the sending of one of RTS frames is completed, STA3 directly starts transmitting PPDUs, the start time of the second duration is a time when the backoff counter of STA3 reaches zero, the second duration is for example a maximum value determined based on synMediumAccessDelayThreshold.

The method embodiments of the disclosure are described in detail above with reference to FIG. 4 to FIG. 29. The apparatus embodiments of the disclosure are described in detail below with reference to FIG. 30 to FIG. 33. It should be understood that the apparatus embodiments and the method embodiments correspond to each other, and similar descriptions may refer to the method embodiments.

Figure 30:
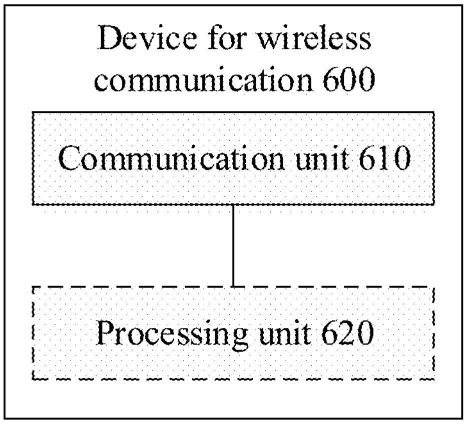
FIG. 30 is a schematic block diagram of a device for wireless communication according to an embodiment of the disclosure.

FIG. 30 shows a schematic block diagram of a device for wireless communication 600 according to an embodiment of the disclosure. The device for wireless communication 600 is a Non-AP MLD, the Non-AP MLD at least includes a first Non-AP STA affiliated to the Non-AP MLD and a second Non-AP STA affiliated to the Non-AP MLD, the first Non-AP STA operates on a primary link and obtains a first TXOP on the primary link, the second Non-AP STA operates on a non-primary link and obtains a second TXOP on the non-primary link.

As shown in FIG. 30, the device for wireless communication 600 includes a communication unit 610.

The communication unit 610 is configured to simultaneously transmit, by the first Non-AP STA affiliated to the Non-AP MLD and the second Non-AP STA affiliated to the Non-AP MLD, at least one PPDU in the first TXOP and the second TXOP respectively.

The first TXOP and the second TXOP meet at least one of following:

- an end time of the second TXOP is no later than an end time of the first TXOP;
- an end time of a transmission sequence in the second TXOP is no later than an end time of a transmission sequence in the first TXOP;
- the end time of the second TXOP is no later than a first time, wherein the first time is a time obtained by adding the end time of the first TXOP to a maximum allowable time deviation; or
- the end time of the transmission sequence in the second TXOP is no later than a second time, wherein the second time is a time formed obtained by the end time of the transmission sequence in the first TXOP to the maximum allowable time deviation.

In some embodiments, a duration of the first TXOP completely overlaps with a duration of the second TXOP in a time domain; or, the duration of the first TXOP partially overlaps with the duration of the second TXOP in the time domain.

In some embodiments, a time when the second Non-AP STA starts transmitting the PPDU in the second TXOP is not earlier than a time when the first Non-AP STA starts transmitting the PPDU in the first TXOP.

In some embodiments, the maximum allowable time deviation is pre-configured or agreed on by a protocol; or, the maximum allowable time deviation is configured by an AP MLD.

In some embodiments, the Non-AP MLD is associated with an NSTR AP MLD, the NSTR AP MLD at least includes a first AP operating on the primary link and a second AP operating on the non-primary link, and a link where the first AP is located and a link where the second AP is located belong to an NSTR link pair of the NSTR AP MLD.

In some embodiments, end times of PPDUs transmitted simultaneously on the primary link and the non-primary link meet an alignment requirement.

In some embodiments, the end times of the PPDUs transmitted simultaneously on the primary link and the non-primary link meeting the alignment requirement includes that: the end times of the PPDUs transmitted simultaneously on the primary link and the non-primary link are the same; or, a difference between the end times of the PPDUs transmitted simultaneously on the primary link and the non-primary link is less than or equal to a preset value.

In some embodiments, regarding the PPDUs transmitted simultaneously on the primary link and the non-primary link, an end time of a PPDU transmitted on the primary link and carrying a reply ACK frame is not later than an end time of a PPDU transmitted on the non-primary link and carrying a reply ACK frame.

In some embodiments, the device for wireless communication 600 further includes a processing unit 620.

In a case that the second Non-AP STA detects that the first Non-AP STA restarts a backoff process on the primary link, the second Non-AP STA affiliated to the Non-AP MLD stops transmitting to-be-transmitted PPDUs on the non-primary link, and the processing unit 620 is configured to restart, by the second Non-AP STA affiliated to the Non-AP MLD, the backoff process on the non-primary link.

In some embodiments, in a case that the second Non-AP STA detects that the first Non-AP STA restarts a backoff process on the primary link, the communication unit 610 is further configured to transmit, by the second Non-AP STA affiliated to the Non-AP MLD, a CF-End frame on the non-primary link, and the CF-End frame is configured to indicate early termination of the second TXOP.

In some embodiments, the device for wireless communication 600 further includes a processing unit 620.

In a case that the second Non-AP STA detects that the first Non-AP STA fails to send PPDUs on the primary link, the first Non-AP STA does not restart a backoff process on the primary link, and the first Non-AP STA executes a PIFS recovery mechanism, the second Non-AP STA stops transmitting to-be-transmitted PPDUs on the non-primary link, and the processing unit 620 is configured to maintain, by the second Non-AP STA affiliated to the Non-AP MLD, a backoff counter thereof to be zero until the first Non-AP STA starts transmitting PPDUs after executing the PIFS recovery mechanism.

In some embodiments, in a case that a condition for triggering the backoff process does not occur and a channel on the non-primary link is detected to be idle during a period when the second Non-AP STA maintains the backoff counter thereof to be zero, the communication unit 610 is further configured to transmit, by the second Non-AP STA affiliated to the Non-AP MLD, PPDUs in the second TXOP, while the first Non-AP STA transmits PPDUs on the primary link after executing the PIFS recovery mechanism.

After the first Non-AP STA executes the PIFS recovery mechanism, end times of PPDUs transmitted simultaneously on the primary link and the non-primary link are the same; or, a difference between the end times of the PPDUs transmitted simultaneously on the primary link and the non-primary link is less than or equal to a preset value.

In some embodiments, in a case that a condition for triggering the backoff process occurs during a period when the second Non-AP STA maintains the backoff counter thereof to be zero, the processing unit 620 is further configured to restart, by the second Non-AP STA affiliated to the Non-AP MLD, the backoff process.

In some embodiments, in a case that a duration setting type used by the first Non-AP STA in the first TXOP is single protection, a duration setting type used by the second Non-AP STA in the second TXOP is also single protection; or, in a case that the duration setting type used by the first Non-AP STA in the first TXOP is single protection, the duration setting type used by the second Non-AP STA in the second TXOP is not allowed to be multiple-protection.

In some embodiments, in a case that a duration setting type used by the first Non-AP STA in the first TXOP is multiple-protection, a duration setting type used by the second Non-AP STA in the second TXOP is single protection or multiple-protection.

In some embodiments, the communication unit may be a communication interface or a transceiver, or an input/output (I/O) interface of a communication chip or a system-on-chip (SOC). The processing unit may be one or more processors.

It should be understood that the device for wireless communication 600 according to the embodiment of the disclosure may correspond to the Non-AP MLD in the method embodiments of the disclosure, and the foregoing and other operations and/or functions of each unit in the device for wireless communication 600 implement corresponding processes of the Non-AP MLD in the method for wireless communication 200 shown in FIG. 4 to FIG. 11 respectively, which are not elaborated here, for the sake of brevity.

Figure 31:
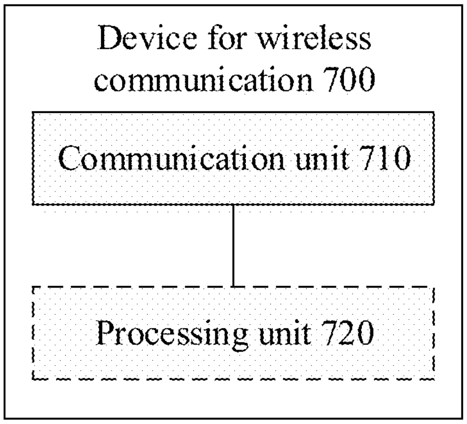
FIG. 31 is a schematic block diagram of another device for wireless communication according to an embodiment of the disclosure.

FIG. 31 shows a schematic block diagram of a device for wireless communication 700 according to an embodiment of the disclosure. The device for wireless communication 700 is an AP MLD, the AP MLD at least includes a first AP affiliated to the AP MLD and a second AP affiliated to the AP MLD, the first AP operates on a primary link and obtains a third TXOP on the primary link, the second AP operates on a non-primary link and obtains a fourth TXOP on the non-primary link.

As shown in FIG. 31, the device for wireless communication 700 includes a communication unit 710.

The communication unit 710 is configured to simultaneously transmit, by the first AP affiliated to the AP MLD and the second AP affiliated to the AP MLD, at least one PPDU in the third TXOP and the fourth TXOP respectively.

The third TXOP and the fourth TXOP meet at least one of following:

- an end time of the fourth TXOP is no later than an end time of the third TXOP;
- an end time of a transmission sequence in the fourth TXOP is no later than an end time of a transmission sequence in the third TXOP;
- the end time of the fourth TXOP is no later than a third time, wherein the third time is a time obtained by adding the end time of the third TXOP to a maximum allowable time deviation; or
- the end time of the transmission sequence in the fourth TXOP is no later than a fourth time, wherein the fourth time is a time obtained by adding the end time of the transmission sequence in the third TXOP to the maximum allowable time deviation.

In some embodiments, a duration of the third TXOP completely overlaps with a duration of the fourth TXOP in a time domain; or the duration of the third TXOP partially overlaps with the duration of the fourth TXOP in the time domain.

In some embodiments, a time when the second AP starts transmitting the PPDU in the fourth TXOP is not earlier than a time when the first AP starts transmitting the PPDU in the third TXOP.

In some embodiments, the maximum allowable time deviation is pre-configured or agreed on by a protocol; or, the maximum allowable time deviation is configured by the AP MLD.

In some embodiments, the AP MLD is an NSTR AP MLD, and a link where the first AP is located and a link where the second AP is located belong to an NSTR link pair of the NSTR AP MLD.

In some embodiments, end times of PPDUs transmitted simultaneously on the primary link and the non-primary link meet an alignment requirement.

In some embodiments, the end times of the PPDUs transmitted simultaneously on the primary link and the non-primary link meeting the alignment requirement includes that: the end times of the PPDUs transmitted simultaneously on the primary link and the non-primary link are the same; or, a difference between the end times of the PPDUs transmitted simultaneously on the primary link and the non-primary link is less than or equal to a preset value.

In some embodiments, regarding the PPDUs transmitted simultaneously on the primary link and the non-primary link, an end time of a PPDU transmitted on the primary link and carrying a reply ACK frame is not later than an end time of a PPDU transmitted on the non-primary link and carrying a reply ACK frame.

In some embodiments, the device for wireless communication 700 further includes a processing unit 720.

In a case that the second AP detects that the first AP restarts a backoff process on the primary link, the communication unit 710 is further configured to stop, by the second AP affiliated to the AP MLD, transmitting to-be-transmitted PPDUs on the non-primary link, and the processing unit 720 is configured to restart, by the second AP affiliated to the AP MLD, the backoff process on the non-primary link.

In some embodiments, in a case that the second AP detects that the first AP restarts a backoff process on the primary link, the communication unit 710 is further configured to transmit, by the second AP affiliated to the AP MLD, a CF-End frame on the non-primary link, and the CF-End frame is configured to indicate early termination of the fourth TXOP.

In some embodiments, in a case that the first AP fails to send PPDUs on the primary link, the processing unit 720 is configured to execute, by the first AP affiliated to the AP MLD, a PIFS recovery mechanism.

In some embodiments, in a case that the second AP detects that the first AP fails to send PPDUs on the primary link, the first AP does not restart a backoff process on the primary link, and the first AP executes a PIFS recovery mechanism, the communication unit 710 is further configured to stop, by the second AP affiliated to the AP MLD, transmitting to-be-transmitted PPDUs on the non-primary link, and the processing unit 720 is configured to maintain, by the second AP affiliated to the AP MLD, a backoff counter thereof to be zero until the first AP starts transmitting PPDUs after executing the PIFS recovery mechanism.

In some embodiments, in a case that a condition for triggering the backoff process does not occur and a channel on the non-primary link is detected to be idle during a period when the second AP maintains the backoff counter thereof to be zero, the communication unit 710 is further configured to transmit, by the second AP affiliated to the AP MLD, PPDUs in the fourth TXOP, while the first AP transmits PPDUs on the primary link after executing the PIFS recovery mechanism.

After the first AP executes the PIFS recovery mechanism, end times of PPDUs transmitted simultaneously on the primary link and the non-primary link are the same; or, a difference between the end times of the PPDUs transmitted simultaneously on the primary link and the non-primary link is less than or equal to a preset value.

In some embodiments, in a case that a condition for triggering the backoff process occurs during a period when the second AP maintains the backoff counter thereof to be zero, the processing unit 720 is configured to restart, by the second AP affiliated to the AP MLD, the backoff process.

In some embodiments, in a case that a duration setting type used by the first AP in the third TXOP is single protection, a duration setting type used by the second AP in the fourth TXOP is also single protection; or, in a case that the duration setting type used by the first AP in the third TXOP is single protection, the duration setting type used by the second AP in the fourth TXOP is not allowed to be multiple-protection.

In some embodiments, in a case that a duration setting type used by the first AP in the third TXOP is multiple-protection, a duration setting type used by the second AP in the fourth TXOP is single protection or multiple-protection.

In some embodiments, the communication unit may be a communication interface or a transceiver, or an I/O interface of a communication chip or a SOC. The processing unit may be one or more processors.

It should be understood that the device for wireless communication 700 according to the embodiment of the disclosure may correspond to the AP MLD in the method embodiments of the disclosure, and the foregoing and other operations and/or functions of each unit in the device for wireless communication 700 implement corresponding processes of the AP MLD in the method for wireless communication 300 shown in FIG. 12 respectively, which are not elaborated here, for the sake of brevity.

Figure 32:
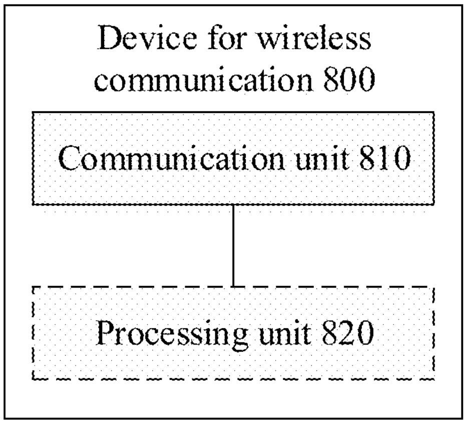
FIG. 32 is a schematic block diagram of yet another device for wireless communication according to an embodiment of the disclosure.

FIG. 32 shows a schematic block diagram of a device for wireless communication 800 according to an embodiment of the disclosure. The device for wireless communication 800 is a Non-AP MLD, the Non-AP MLD at least includes a first Non-AP STA affiliated to the Non-AP MLD and a second Non-AP STA affiliated to the Non-AP MLD, the first Non-AP STA operates on a primary link, the second Non-AP STA operates on a non-primary link.

As shown in FIG. 32, the device for wireless communication 800 includes a communication unit 810.

The communication unit 810 is configured to perform, by the first Non-AP STA affiliated to the Non-AP MLD, channel access on the primary link according to a first duration.

In some embodiments, a start time of the first duration is a time when a backoff counter of the first Non-AP STA backs off to zero, and the first duration is less than or equal to a synchronous medium access delay threshold.

In some embodiments, the synchronous medium access delay threshold indicates a maximum value of a difference between an end time of a TXOP obtained on the non-primary link and an end time of a TXOP obtained on the primary link, in a case that the end time of the TXOP obtained on the non-primary link is later than the end time of the TXOP obtained on the primary link.

In some embodiments, the synchronous medium access delay threshold is pre-configured or agreed on by a protocol; or, the synchronous medium access delay threshold is configured by an AP MLD.

In some embodiments, the device for wireless communication 800 includes a processing unit 820.

The processing unit 820 is configured to maintain, by the first Non-AP STA affiliated to the Non-AP MLD, the backoff counter thereof to be zero after the backoff counter of the first Non-AP STA backs off to zero.

The communication unit 810 is configured to start, by the first Non-AP STA affiliated to the Non-AP MLD, transmitting PPDUs when medium is idle, when a condition for triggering the first Non-AP STA to back off again does not occur and the second Non-AP STA obtains a TXOP in the first duration.

In some embodiments, when the first Non-AP STA starts transmitting PPDUs, the second Non-AP STA also starts transmitting PPDUs, and the second Non-AP STA and the first Non-AP STA transmit PPDUs synchronously.

The second Non-AP STA and the first Non-AP STA transmitting PPDUs synchronously includes that the second Non-AP STA and the first Non-AP STA transmit PPDUs simultaneously, and the PPDUs transmitted simultaneously meet an alignment requirement of end times.

In some embodiments, the device for wireless communication 800 includes a processing unit 820.

The processing unit 820 is configured to maintain, by the first Non-AP STA affiliated to the Non-AP MLD, the backoff counter thereof to be zero after the backoff counter of the first Non-AP STA backs off to zero.

When until a condition for triggering the first Non-AP STA to back off again occurs in the first duration, the second Non-AP STA does not obtain a TXOP, the processing unit 820 is configured to restart, by the first Non-AP STA affiliated to the Non-AP MLD, a backoff process.

In some embodiments, the device for wireless communication 800 includes a processing unit 820.

The processing unit 820 is configured to maintain, by the first Non-AP STA affiliated to the Non-AP MLD, the backoff counter thereof to be zero after the backoff counter of the first Non-AP STA backs off to zero.

The communication unit 810 is configured to start, by the first Non-AP STA affiliated to the Non-AP MLD, transmitting PPDUs when medium is idle after the first duration, when a condition for triggering the first Non-AP STA to back off again does not occur and the second Non-AP STA does not obtain a TXOP in the first duration.

In some embodiments, the communication unit 810 is specifically configured to:

- send, by the first Non-AP STA affiliated to the Non-AP MLD, a CTS-to-self frame on the primary link in the first duration, when the backoff counter of the first Non-AP STA backs off to zero and medium is idle; and
- start, by the first Non-AP STA affiliated to the Non-AP MLD, transmitting PPDUs when medium is idle, when a condition for triggering the first Non-AP STA to back off again does not occur and the second Non-AP STA obtains a TXOP in a first waiting duration.

A start time of the first waiting duration is a time with an interval of a SIFS from a time that the first Non-AP STA finishes sending the CTS-to-self frame, and an end time of the first waiting duration is an end time of the first duration.

In some embodiments, when the first Non-AP STA starts transmitting PPDUs, the second Non-AP STA also starts transmitting PPDUs, and the second Non-AP STA and the first Non-AP STA transmit PPDUs synchronously.

The second Non-AP STA and the first Non-AP STA transmitting PPDUs synchronously includes that the second Non-AP STA and the first Non-AP STA transmit PPDUs simultaneously, and the PPDUs transmitted simultaneously meet an alignment requirement of end times.

In some embodiments, the device for wireless communication 800 includes a processing unit 820.

The communication unit 810 is further configured to send, by the first Non-AP STA affiliated to the Non-AP MLD, a CTS-to-self frame on the primary link in the first duration, when the backoff counter of the first Non-AP STA backs off to zero and medium is idle.

When until a condition for triggering the first Non-AP STA to back off again occurs in a first waiting duration, the second Non-AP STA does not obtain a TXOP, the processing unit 820 is configured to restart, by the first Non-AP STA affiliated to the Non-AP MLD, a backoff process.

A start time of the first waiting duration is a time with an interval of a SIFS from a time that the first Non-AP STA finishes sending the CTS-to-self frame, and an end time of the first waiting duration is an end time of the first duration.

In some embodiments, the communication unit 810 is specifically configured to:

send, by the first Non-AP STA affiliated to the Non-AP MLD, a CTS-to-self frame on the primary link in the first duration, when the backoff counter of the first Non-AP STA backs off to zero and medium is idle; and start, by the first Non-AP STA affiliated to the Non-AP MLD, transmitting PPDUs when the medium is idle after a first waiting duration, in a case that a condition for triggering the first Non-AP STA to back off again does not occur and the second Non-AP STA does not obtain a TXOP in the first waiting duration.

A start time of the first waiting duration is a time with an interval of a SIFS from a time that the first Non-AP STA finishes sending the CTS-to-self frame, and an end time of the first waiting duration is an end time of the first duration.

In some embodiments, the communication unit 810 is specifically configured to:

send, by the first Non-AP STA affiliated to the Non-AP MLD, at least one RTS frame in the first duration, and receive, by the first Non-AP STA, a CTS frame after a SIFS elapses from sending of the at least one RTS frame is completed; and start, by the first Non-AP STA affiliated to the Non-AP MLD, transmitting PPDUs.

In some embodiments, in a case that the second Non-AP STA obtains a TXOP, when the first Non-AP STA starts transmitting PPDUs, the second Non-AP STA also starts transmitting PPDUs, and the second Non-AP STA and the first Non-AP STA transmit PPDUs synchronously.

The second Non-AP STA and the first Non-AP STA transmitting PPDUs synchronously includes that the second Non-AP STA and the first Non-AP STA transmit PPDUs simultaneously, and the PPDUs transmitted simultaneously meet an alignment requirement of end times thereof.

In some embodiments, the communication unit 810 is specifically configured to:

send, by the first Non-AP STA affiliated to the Non-AP MLD, at least one RTS frame in the first duration, when the backoff counter of the first Non-AP STA backs off to zero and medium is idle, and not receive, by the first Non-AP STA, a CTS frame; and start, by the first Non-AP STA affiliated to the Non-AP MLD, transmitting PPDUs when the medium is idle, in a case that a condition for triggering the first Non-AP STA to back off again does not occur and the second Non-AP STA obtains a TXOP in the first duration.

In some embodiments, when the first Non-AP STA starts transmitting PPDUs, the second Non-AP STA also starts transmitting PPDUs, and the second Non-AP STA and the first Non-AP STA transmit PPDUs synchronously.

The second Non-AP STA and the first Non-AP STA transmitting PPDUs synchronously includes that the second Non-AP STA and the first Non-AP STA transmit PPDUs simultaneously, and the PPDUs transmitted simultaneously meet an alignment requirement of end times.

In some embodiments, the device for wireless communication 800 includes a processing unit 820.

The communication unit 810 is configured to send, by the first Non-AP STA affiliated to the Non-AP MLD, at least one RTS frame in the first duration, when the backoff counter of the first Non-AP STA backs off to zero and medium is idle, and not receive, by the first Non-AP STA, a CTS frame.

When until a condition for triggering the first Non-AP STA to back off again occurs in the first duration, the second Non-AP STA does not obtain a TXOP, The processing unit 820 is configured to restart, by the first Non-AP STA affiliated to the Non-AP MLD, a backoff process.

In some embodiments, the communication unit 810 is specifically configured to:

send, by the first Non-AP STA affiliated to the Non-AP MLD, at least one RTS frame in the first duration, when the backoff counter of the first Non-AP STA backs off to zero and medium is idle, and not receive, by the first Non-AP STA, a CTS frame; and start, by the first Non-AP STA affiliated to the Non-AP MLD, transmitting PPDUs when the medium is idle after the first duration, in a case that a condition for triggering the first Non-AP STA to back off again does not occur and the second Non-AP STA does not obtain a TXOP in the first duration.

In some embodiments, the Non-AP MLD is associated with an NSTR AP MLD, the NSTR AP MLD at least includes a first AP affiliated to the NSTR AP MLD and a second AP affiliated to the NSTR AP MLD, the first AP operates on the primary link, the second AP operates on the non-primary link, and a link where the first AP is located and a link where the second AP is located belong to an NSTR link pair of the NSTR AP MLD.

In some embodiments, the communication unit may be a communication interface or a transceiver, or an I/O interface of a communication chip or a SOC. The processing unit may be one or more processors.

It should be understood that the device for wireless communication 800 according to the embodiment of the disclosure may correspond to the Non-AP MLD in the method embodiments of the disclosure, and the foregoing and other operations and/or functions of each unit in the device for wireless communication 800 implement corresponding processes of the Non-AP MLD in the method for wireless communication 400 shown in FIG. 20 respectively, which are not elaborated here, for the sake of brevity.

Figure 33:
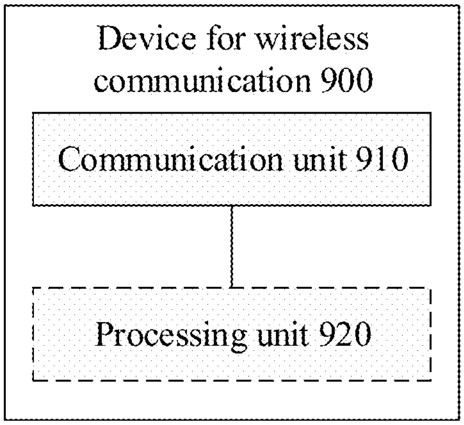
FIG. 33 is a schematic block diagram of still another device for wireless communication according to an embodiment of the disclosure.

FIG. 33 shows a schematic block diagram of a device for wireless communication 900 according to an embodiment of the disclosure. The device for wireless communication 900 is a third Non-AP STA, the third Non-AP STA is associated with a first AP affiliated to an AP MLD, the AP MLD at least includes the first AP affiliated to the AP MLD and a second AP affiliated to the AP MLD, the third Non-AP STA and the first AP operate on a primary link, the second AP operates on a non-primary link.

As shown in FIG. 33, the device for wireless communication 900 includes a communication unit 910.

The communication unit 910 is configured to perform channel access on the primary link according to a second duration.

In some embodiments, a start time of the second duration is a time when a backoff counter of the first Non-AP STA backs off to zero, and the second duration is less than or equal to a synchronous medium access delay threshold.

In some embodiments, the synchronous medium access delay threshold indicates a maximum value of a difference between an end time of a TXOP obtained on the non-primary link and an end time of a TXOP obtained on the primary link, in a case that the end time of the TXOP obtained on the non-primary link is later than the end time of the TXOP obtained on the primary link.

In some embodiments, the synchronous medium access delay threshold is pre-configured or agreed on by a protocol; or, the synchronous medium access delay threshold is configured by the AP MLD.

In some embodiments, the device for wireless communication 900 includes a processing unit 920.

The processing unit 920 is configured to maintain the backoff counter of the third Non-AP STA to be zero after the backoff counter of the third Non-AP STA backs off to zero.

The processing unit 920 is configured to restart a backoff process when a condition for triggering the third Non-AP STA to back off again occurs in the second duration.

In some embodiments, the device for wireless communication 900 includes a processing unit 920.

The processing unit 920 is configured to maintain the backoff counter of the third Non-AP STA to be zero after the backoff counter of the third Non-AP STA backs off to zero.

The communication unit 810 is further configured to start transmitting PPDUs when medium is idle after the second duration, when a condition for triggering the third Non-AP STA to back off again does not occur in the second duration.

In some embodiments, the device for wireless communication 900 includes a processing unit 920.

The communication unit 910 is further configured to send a CTS-to-self frame on the primary link in the second duration, when the backoff counter of the third Non-AP STA backs off to zero and medium is idle.

The processing unit 920 is configured to restart a backoff process when a condition for triggering the third Non-AP STA to back off again occurs in a second waiting duration.

A start time of the second waiting duration is a time with an interval of a SIFS from a time that the third Non-AP STA finishes sending the CTS-to-self frame, and an end time of the second waiting duration is an end time of the second duration.

In some embodiments, the communication unit 910 is specifically configured to:

send a CTS-to-self frame on the primary link in the first duration, when the backoff counter of the third Non-AP STA backs off to zero and medium is idle; and start transmitting PPDUs when the medium is idle after a second waiting duration, in a case that a condition for triggering the first Non-AP STA to back off again does not occur in the second waiting duration.

A start time of the second waiting duration is a time with an interval of a SIFS from a time that the third Non-AP STA finishes sending the CTS-to-self frame, and an end time of the second waiting duration is an end time of the second duration.

In some embodiments, the communication unit 910 is specifically configured to:

send at least one RTS frame in the second duration, when the backoff counter of the third Non-AP STA backs off to zero and medium is idle, and receive, by the third Non-AP STA, a CTS frame after a SIFS elapses from sending of the at least one RTS frame is completed; and start transmitting PPDUs.

In some embodiments, the device for wireless communication 900 includes a processing unit 920.

The communication unit 910 is further configured to: send at least one RTS frame in the second duration, when the backoff counter of the third Non-AP STA backs off to zero and medium is idle, and not receive, by the third Non-AP STA, a CTS frame.

The processing unit 920 is configured to restart a backoff process when a condition for triggering the first Non-AP STA to back off again occurs in the second duration.

In some embodiments, the communication unit 910 is specifically configured to:

send at least one RTS frame in the second duration, when the backoff counter of the third Non-AP STA backs off to zero and medium is idle, and not receive, by the third Non-AP STA, a CTS frame; and start transmitting PPDUs when the medium is idle after the first duration, in a case that a condition for triggering the first Non-AP STA to back off again does not occur in the second duration.

In some embodiments, the AP MLD is an NSTR AP MLD, and a link where the first AP is located and a link where the second AP is located belong to an NSTR link pair of the NSTR AP MLD.

In some embodiments, the communication unit may be a communication interface or a transceiver, or an I/O interface of a communication chip or a SOC. The processing unit may be one or more processors.

It should be understood that the device for wireless communication 900 according to the embodiment of the disclosure may correspond to the Non-AP MLD in the method embodiments of the disclosure, and the foregoing and other operations and/or functions of each unit in the device for wireless communication 900 implement corresponding processes of the third Non-AP STA in the method for wireless communication 500 shown in FIG. 26 respectively, which are not elaborated here, for the sake of brevity.

Figure 34:
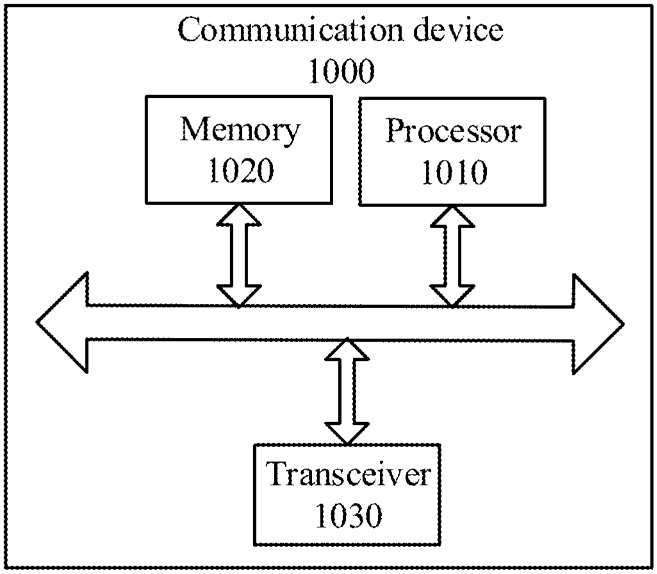
FIG. 34 is a schematic block diagram of a communication device according to an embodiment of the disclosure.

FIG. 34 shows a schematic structural diagram of a communication device 1000 according to an embodiment of the disclosure. The communications device 1000 shown in FIG. 34 includes a processor 1010, and the processor 1010 may call and run a computer program from a memory, to implement the methods in the embodiments of the disclosure.

In some embodiments, as shown in FIG. 34, the communications device 1000 may further include a memory 1020. The processor 1010 may call and run a computer program from the memory 1020, to implement the methods in the embodiments of the disclosure.

The memory 1020 may be a separate device independent of the processor 1010, or may be integrated in the processor 1010.

In some embodiments, as shown in FIG. 34, the communication device 1000 may further include a transceiver 1030, and the processor 1010 may control the transceiver 1030 to communicate with other devices. Specifically, the processor 1010 may control the transceiver 1030 to send information or data to other devices, or receive information or data sent by other devices.

The transceiver 1030 may include a transmitter and a receiver. The transceiver 1030 may further include an antenna, and there may be one or more antennas in number.

In some embodiments, the communication device 1000 may specifically be the device for wireless communication in the embodiments of the disclosure, and the communication device 1000 may implement corresponding processes implemented by the Non-AP MLD in each method of the embodiments of the disclosure, which are not elaborated here, for the sake of brevity.

In some embodiments, the communications device 1000 may specifically be the device for wireless communication in the embodiments of the disclosure, and the communication device 1000 may implement corresponding processes implemented by the AP MLD in each method of the embodiments of the disclosure, which are not elaborated here, for the sake of brevity.

In some embodiments, the communication device 1000 may specifically be the device for wireless communication in the embodiments of the disclosure, and the communication device 1000 may implement corresponding processes implemented by the third Non-AP STA in each method of the embodiments of the disclosure, which are not elaborated here, for the sake of brevity.

Figure 35:
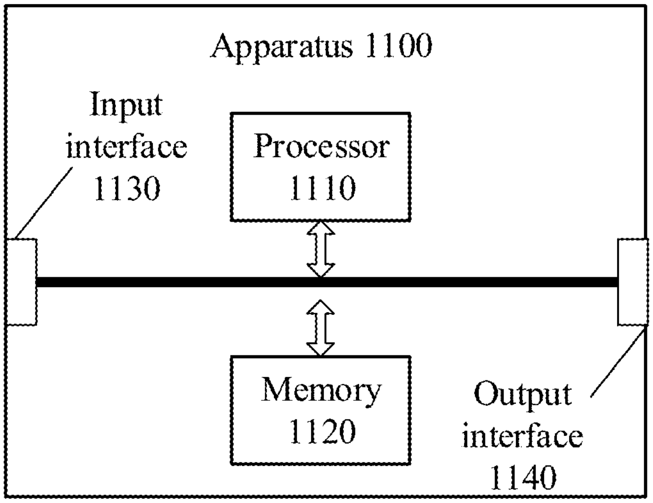
FIG. 35 is a schematic block diagram of an apparatus according to an embodiment of the disclosure.

FIG. 35 is a schematic structural diagram of an apparatus according to an embodiment of the disclosure. The apparatus 1100 shown in FIG. 35 includes a processor 1110, and the processor 1110 may call and run a computer program from a memory, to implement the methods in the embodiments of the disclosure.

In some embodiments, as shown in FIG. 35, the apparatus 1100 may further include a memory 1120. The processor 1110 may call and run a computer program from the memory 1120, to implement the methods in the embodiments of the disclosure.

The memory 1120 may be a separate device independent of the processor 1110, or may be integrated in the processor 1110.

In some embodiments, the apparatus 1100 may further include an input interface 1130. The processor 1110 may control the input interface 1130 to communicate with other devices or chips. Specifically, the processor 1110 may control the input interface 1130 to acquire information or data sent by other devices or chips.

In some embodiments, the apparatus 1100 may further include an output interface 1140. The processor 1110 may control the output interface 1140 to communicate with other devices or chips. Specifically, the processor 1110 may control the output interface 1140 to output information or data to other devices or chips.

In some embodiments, the apparatus may be applied to the device for wireless communication in the embodiments of the disclosure, and the apparatus may implement corresponding processes implemented by the Non-AP MLD device in each method of the embodiments of the disclosure, which are not elaborated here, for the sake of brevity.

In some embodiments, the apparatus may be applied to the device for wireless communication in the embodiments of the disclosure, and the apparatus may implement corresponding processes implemented by the AP MLD in each method of the embodiments of the disclosure, which are not elaborated here, for the sake of brevity.

In some embodiments, the apparatus may be applied to the device for wireless communication in the embodiments of the disclosure, and the apparatus may implement corresponding processes implemented by the third Non-AP STA in each method of the embodiments of the disclosure, which are not elaborated here, for the sake of brevity.

In some embodiments, the apparatus mentioned in the embodiments of the disclosure may also be a chip. For example, the apparatus may be a system-level chip, a system chip, a chip system, or a SOC chip, etc.

It should be understood that the processor in the embodiments of the disclosure may be an integrated circuit chip with signal processing capability. During implementation, each operation of the above method embodiments may be completed by an integrated logic circuit in form of hardware in a processor or instructions in form of software. The above processor may be a general-purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components, so that various methods, operations and logic block diagrams disclosed in the embodiments of the disclosure may be implemented or executed. The general-purpose processor may be a microprocessor, or the processor may be any conventional processor, etc. Operations of the methods disclosed in combination with the embodiments of the disclosure may be directly embodied as being performed and completed by a hardware decoding processor, or by a combination of hardware in the decoding processor and software modules. The software modules may be located in a mature storage medium in the field, such as a Random Access Memory (RAM), a flash memory, a Read-Only Memory (ROM), a Programmable ROM (PROM), or an electrically erasable programmable memory, a register, etc. The storage medium is located in a memory, and the processor reads information in the memory, and completes operations of the above methods in combination with hardware thereof.

It may be understood that the memory in the embodiments of the disclosure may be a volatile memory or a non-volatile memory, or may include both volatile and non-volatile memories. The non-volatile memory may be a ROM, a PROM, an Erasable PROM (EPROM), an Electrically EPROM (EEPROM) or a flash memory. The volatile memory may be a RAM which is used as an external cache. By way of exemplary rather than limiting descriptions, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories of the systems and methods described here are intended to include, but are not limited to these and any other suitable types of memories.

It should be understood that the above memories are exemplary rather than limiting descriptions. For example, the memory in the embodiments of the disclosure may also be a SRAM, a DRAM, a SDRAM, a DDR SDRAM, an ESDRAM, a SLDRAM, a DR RAM, etc. That is, the memory in the embodiments of the disclosure is intended to include, but is not limited to these and any other suitable types of memories.

An embodiment of the disclosure further provides a computer-readable storage medium, the computer-readable storage medium is configured to store a computer program.

In some embodiments, the computer-readable storage medium may be applied to the device for wireless communication in the embodiments of the disclosure, and the computer program allows a computer to execute corresponding processes implemented by the Non-AP MLD in each method of the embodiments of the disclosure, which are not elaborated here, for the sake of brevity.

In some embodiments, the computer-readable storage medium may be applied to the device for wireless communication in the embodiments of the disclosure, and the computer program allows a computer to execute corresponding processes implemented by the AP MLD in each method of the embodiments of the disclosure, which are not elaborated here, for the sake of brevity.

In some embodiments, the computer-readable storage medium may be applied to the device for wireless communication in the embodiments of the disclosure, and the computer program allows a computer to execute corresponding processes implemented by the third Non-AP STA in each method of the embodiments of the disclosure, which are not elaborated here, for the sake of brevity An embodiment of the disclosure further provides a computer program product, the computer program product includes computer program instructions.

In some embodiments, the computer program product may be applied to the device for wireless communication in the embodiments of the disclosure, and the computer program instructions allow a computer to execute corresponding processes implemented by the Non-AP MLD in each method of the embodiments of the disclosure, which are not elaborated here, for the sake of brevity.

In some embodiments, the computer program product may be applied to the device for wireless communication in the embodiments of the disclosure, and the computer program instructions allow a computer to execute corresponding processes implemented by the AP MLD in each method of the embodiments of the disclosure, which are not elaborated here, for the sake of brevity.

In some embodiments, the computer program product may be applied to the device for wireless communication in the embodiments of the disclosure, and the computer program instructions allow a computer to execute corresponding processes implemented by the third Non-AP STA in each method of the embodiments of the disclosure, which are not elaborated here, for the sake of brevity.

An embodiment of the disclosure further provides a computer program.

In some embodiments, the computer program may be applied to the device for wireless communication in the embodiments of the disclosure, and the computer program allows a computer to execute corresponding processes implemented by the Non-AP MLD in each method of the embodiments of the disclosure when the computer program is run on the computer, which are not elaborated here, for the sake of brevity.

In some embodiments, the computer program may be applied to the device for wireless communication in the embodiments of the disclosure, and the computer program allows a computer to execute corresponding processes implemented by the AP MLD in each method of the embodiments of the disclosure when the computer program is run on the computer, which are not elaborated here, for the sake of brevity.

In some embodiments, the computer program may be applied to the device for wireless communication in the embodiments of the disclosure, and the computer program allows a computer to execute corresponding processes implemented by the third Non-AP STA in each method of the embodiments of the disclosure when the computer program is run on the computer, which are not elaborated here, for the sake of brevity.

It may be appreciated by those of ordinary skill in the art that units and algorithm steps of each example described in combination with the embodiments disclosed here may be implemented by electronic hardware, or a combination of computer software and electronic hardware. Whether these functions are executed by hardware or software, depends on specific applications and design constraints of the technical solutions. Professional technicians may use different methods in each specific application to implement the described functions, however, such implementation should not be considered as going beyond the scope of the disclosure.

It may be clearly understood by those skilled in the art that for the sake of convenience and brevity of descriptions, specific working processes of the above systems, apparatuses and units may refer to corresponding processes in the foregoing method embodiments, which are not elaborated here.

In several embodiments provided in the disclosure, it should be understood that the disclosed systems, apparatuses and methods may be implemented in other ways. For example, the above apparatus embodiments are only illustrative. For example, division of the units is only a logical function division. In an actual implementation, there may be other division manners. For example, multiple units or components may be combined or may be integrated into another system, or some features may be ignored or may not be executed. In another point, mutual coupling or direct coupling or communication connection as shown or discussed may be indirect coupling or communication connection through some interfaces, apparatuses or units, and may be in electrical, mechanical or other forms.

The units described as separate components may be or may not be physically separated, and the components displayed as units may be or may not be physical units, that is, they may be located at one place, or may be distributed on multiple network units. Part or all of the units may be selected according to actual requirements, to achieve the purpose of the solutions of the embodiments.

Furthermore, each function unit in each embodiment of the disclosure may be integrated into one processing unit, or each unit may separately exist physically, or two or more units may be integrated into one unit.

When the functions are implemented in form of a software function unit and sold or used as an independent product, the functions may be stored in a computer-readable storage medium. Based on such understanding, the technical solutions of the disclosure substantially or parts making contributions to the related art or part of the technical solutions may be embodied in form of a software product, and the computer software product is stored in a storage medium, including several instructions to enable a computer device (which may be a personal computer, a server, or a network device, etc.) to execute all or part of operations of the method described in each embodiment of the disclosure. The foregoing storage medium includes various media capable of storing program codes, such as a U disk, a mobile hard disk, a ROM, a RAM, a magnetic disk or an optical disk, etc.

The above descriptions are only specific implementations of the disclosure, however, the scope of protection of the disclosure is not limited thereto. Variations or substitutions easily conceived by any technician familiar with this technical field within the technical scope disclosed in the disclosure, should fall within the scope of protection of the disclosure. Therefore, the scope of protection of the disclosure shall be subjected to the scope of protection of the claims.

The invention claimed is:

1. A method for wireless communication, applied to a non-access point multi-link device (Non-AP MLD), wherein the Non-AP MLD at least comprises a first non-access point station (Non-AP STA) affiliated to the Non-AP MLD and a second Non-AP STA affiliated to the Non-AP MLD, the first Non-AP STA operates on a primary link and obtains a first transmission opportunity (TXOP) on the primary link, the second Non-AP STA operates on a non-primary link and obtains a second TXOP on the non-primary link, and the method comprises:

simultaneously transmitting, by the first Non-AP STA affiliated to the Non-AP MLD and the second Non-AP STA affiliated to the Non-AP MLD, at least one physical layer protocol data unit (PPDU) in the first TXOP and the second TXOP respectively, wherein the first TXOP and the second TXOP meet:

end times of PPDUs transmitted simultaneously on the primary link and the non-primary link meet an alignment requirement;

wherein the end times of PPDUs transmitted simultaneously on the primary link and the non-primary link meet an alignment requirement comprises:

the end times of the PPDUs transmitted simultaneously on the primary link and the non-primary link are different and a difference between the end times of the PPDUs transmitted simultaneously on the primary link and the non-primary link is less than or equal to 8 microseconds, wherein the method further comprises:

in a case that the second Non-AP STA detects that the first Non-AP STA fails to send PPDUs on the primary link, the first Non-AP STA does not restart a backoff process on the primary link, and the first Non-AP STA executes a priority interframe space (PIFS) recovery mechanism, stopping, by the second Non-AP STA, transmitting to-be-transmitted PPDUs on the non-primary link, and maintaining, by the second Non-AP STA, a backoff counter thereof to be zero until the first Non-AP STA starts transmitting PPDUs after executing the PIFS recovery mechanism.

2. The method of claim 1, wherein a duration of the first TXOP completely overlaps with a duration of the second TXOP in a time domain; or the duration of the first TXOP partially overlaps with the duration of the second TXOP in the time domain.

3. The method of claim 1, wherein a time when the second Non-AP STA starts transmitting the PPDU in the second TXOP is not earlier than a time when the first Non-AP STA starts transmitting the PPDU in the first TXOP.

4. The method of claim 1, wherein the Non-AP MLD is associated with a Non Simultaneous Transmit and Receive (NSTR) access point multi-link device (AP MLD), the NSTR AP MLD at least comprises a first access point (AP) operating on the primary link and a second AP operating on the non-primary link, and a link where the first AP is located and a link where the second AP is located belong to an NSTR link pair of the NSTR AP MLD.

5. The method of claim 1, wherein regarding the PPDUs transmitted simultaneously on the primary link and the non-primary link, an end time of a PPDU transmitted on the primary link and carrying a reply acknowledgment (ACK) frame is not later than an end time of a PPDU transmitted on the non-primary link and carrying a reply ACK frame.

6. The method of claim 1, further comprising:

in a case that the second Non-AP STA detects that the first Non-AP STA restarts the backoff process on the primary link, stopping, by the second Non-AP STA, transmitting the to-be-transmitted PPDUs on the non-primary link, and restarting, by the second Non-AP STA, the backoff process on the non-primary link.

7. The method of claim 1, further comprising:

in a case that the second Non-AP STA detects that the first Non-AP STA restarts the backoff process on the primary link, transmitting, by the second Non-AP STA, a Contention Free End (CF-End) frame on the non-primary link, wherein the CF-End frame is configured to indicate early termination of the second TXOP.

8. The method of claim 1, further comprising:

in a case that a condition for triggering the backoff process does not occur and a channel on the non-primary link is detected to be idle during a period when the second Non-AP STA maintains the backoff counter thereof to be zero, transmitting, by the second Non-AP STA, PPDUs in the second TXOP, while transmitting, by the first Non-AP STA, PPDUs on the primary link after executing the PIFS recovery mechanism, wherein after the first Non-AP STA executes the PIFS recovery mechanism, end times of PPDUs transmitted simultaneously on the primary link and the non-primary link are the same; or, a difference between the end times of the PPDUs transmitted simultaneously on the primary link and the non-primary link is less than or equal to a preset value.

9. The method of claim 1, further comprising:

in a case that a condition for triggering the backoff process occurs during a period when the second Non-AP STA maintains the backoff counter thereof to be zero, restarting, by the second Non-AP STA, the backoff process.

10. The method of claim 1, wherein in a case that a duration setting type used by the first Non-AP STA in the first TXOP is single protection, a duration setting type used by the second Non-AP STA in the second TXOP is also single protection; or in a case that the duration setting type used by the first Non-AP STA in the first TXOP is single protection, the duration setting type used by the second Non-AP STA in the second TXOP is not allowed to be multiple-protection.

11. The method of claim 1, wherein in a case that a duration setting type used by the first Non-AP STA in the first TXOP is multiple-protection, a duration setting type used by the second Non-AP STA in the second TXOP is single protection or multiple-protection.

12. A device for wireless communication, used as a non-access point multi-link device (Non-AP MLD), wherein the Non-AP MLD at least comprises a first non-access point station (Non-AP STA) affiliated to the Non-AP MLD and a second Non-AP STA affiliated to the Non-AP MLD, the first Non-AP STA operates on a primary link and obtains a first transmission opportunity (TXOP) on the primary link, the second Non-AP STA operates on a non-primary link and obtains a second TXOP on the non-primary link, wherein the device comprises:

a memory, configured to store a computer program; and a processor, configured to call and run the computer program stored in the memory, to execute a method for wireless communication comprising:

simultaneously transmitting, by the first Non-AP STA affiliated to the Non-AP MLD and the second Non-AP STA affiliated to the Non-AP MLD, at least one physical layer protocol data unit (PPDU) in the first TXOP and the second TXOP respectively, wherein the first TXOP and the second TXOP meet:

end times of PPDUs transmitted simultaneously on the primary link and the non-primary link meet an alignment requirement;

wherein the end times of PPDUs transmitted simultaneously on the primary link and the non-primary link meet an alignment requirement comprises:

the end times of the PPDUs transmitted simultaneously on the primary link and the non-primary link are different and a difference between the end times of the PPDUs transmitted simultaneously on the primary link and the non-primary link is less than or equal to 8 microseconds, wherein the method further comprises:

in a case that the second Non-AP STA detects that the first Non-AP STA fails to send PPDUs on the primary link, the first Non-AP STA does not restart a backoff process on the primary link, and the first Non-AP STA executes a priority interframe space (PIFS) recovery mechanism, stopping, by the second Non-AP STA, transmitting to-be-transmitted PPDUs on the non-primary link, and maintaining, by the second Non-AP STA, a backoff counter thereof to be zero until the first Non-AP STA starts transmitting PPDUs after executing the PIFS recovery mechanism.

13. The device of claim 12, wherein a duration of the first TXOP completely overlaps with a duration of the second TXOP in a time domain; or the duration of the first TXOP partially overlaps with the duration of the second TXOP in the time domain.

14. The device of claim 12, wherein a time when the second Non-AP STA starts transmitting the PPDU in the second TXOP is not earlier than a time when the first Non-AP STA starts transmitting the PPDU in the first TXOP.

15. The device of claim 12, wherein the Non-AP MLD is associated with a Non Simultaneous Transmit and Receive (NSTR) access point multi-link device (AP MLD), the NSTR AP MLD at least comprises a first access point (AP) operating on the primary link and a second AP operating on the non-primary link, and a link where the first AP is located and a link where the second AP is located belong to an NSTR link pair of the NSTR AP MLD.

16. The device of claim 12, wherein in a case that a duration setting type used by the first Non-AP STA in the first TXOP is single protection, a duration setting type used by the second Non-AP STA in the second TXOP is also single protection; or in a case that the duration setting type used by the first Non-AP STA in the first TXOP is single protection, the duration setting type used by the second Non-AP STA in the second TXOP is not allowed to be multiple-protection.

17. The device of claim 12, wherein in a case that a duration setting type used by the first Non-AP STA in the first TXOP is multiple-protection, a duration setting type used by the second Non-AP STA in the second TXOP is single protection or multiple-protection.

18. The device of claim 12, wherein the method further comprises:

in a case that the second Non-AP STA detects that the first Non-AP STA restarts the backoff process on the primary link, transmitting, by the second Non-AP STA, a Contention Free End (CF-End) frame on the non-primary link, wherein the CF-End frame is configured to indicate early termination of the second TXOP.

19. The device of claim 12, wherein the method further comprises:

in a case that a condition for triggering the backoff process does not occur and a channel on the non-primary link is detected to be idle during a period when the second Non-AP STA maintains the backoff counter thereof to be zero, transmitting, by the second Non-AP STA, PPDUs in the second TXOP, while transmitting, by the first Non-AP STA, PPDUs on the primary link after executing the PIFS recovery mechanism, wherein after the first Non-AP STA executes the PIFS recovery mechanism, end times of PPDUs transmitted simultaneously on the primary link and the non-primary link are the same; or, a difference between the end times of the PPDUs transmitted simultaneously on the primary link and the non-primary link is less than or equal to a preset value.

20. The device of claim 12, wherein the method further comprises:

in a case that a condition for triggering the backoff process occurs during a period when the second Non-AP STA maintains the backoff counter thereof to be zero, restarting, by the second Non-AP STA, the backoff process.

* * * * *